(12) United States Patent
Zhang et al.

(10) Patent No.: US 12,000,989 B2
(45) Date of Patent: Jun. 4, 2024

(54) IMAGING LENS ASSEMBLY

(71) Applicant: ZHEJIANG SUNNY OPTICS CO., LTD., Zhejiang (CN)

(72) Inventors: Yi Zhang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 528 days.

(21) Appl. No.: 17/352,397

(22) Filed: Jun. 21, 2021

(65) Prior Publication Data

US 2022/0003969 A1 Jan. 6, 2022

(30) Foreign Application Priority Data

Jul. 3, 2020 (CN) .......................... 202010630774.8

(51) Int. Cl.
*G02B 13/00* (2006.01)
*G02B 5/00* (2006.01)
*G02B 9/60* (2006.01)
*G02B 27/00* (2006.01)

(52) U.S. Cl.
CPC ......... *G02B 13/0045* (2013.01); *G02B 5/005* (2013.01); *G02B 9/60* (2013.01); *G02B 27/0025* (2013.01)

(58) Field of Classification Search
CPC ....... G02B 13/0045; G02B 5/005; G02B 9/60
See application file for complete search history.

(56) References Cited

U.S. PATENT DOCUMENTS

| 9,753,249 | B2 | 9/2017 | Liao et al. | |
|---|---|---|---|---|
| 2019/0094500 | A1* | 3/2019 | Tseng | .................. G02B 9/60 |
| 2019/0271832 | A1* | 9/2019 | Kuo | ............... G02B 13/0045 |
| 2019/0278064 | A1* | 9/2019 | Tseng | ............ G02B 13/0045 |

FOREIGN PATENT DOCUMENTS

IN 201824015573 A 4/2019

OTHER PUBLICATIONS

Corresponding IN application search results issued on Feb. 25, 2022.

* cited by examiner

*Primary Examiner* — Christopher Stanford
*Assistant Examiner* — Journey F Sumlar
(74) *Attorney, Agent, or Firm* — Samson G. Yu

(57) ABSTRACT

The disclosure provides an imaging lens assembly, which sequentially includes, a movable diaphragm, a first lens, a second lens with a refractive power, a third lens with a refractive power, a fourth lens with a positive refractive power and a fifth lens with a refractive power, wherein an effective focal length f1 of the first lens and an effective focal length f4 of the fourth lens meet 1.0<f4/f1<2.3; and TSmin, a distance from the movable diaphragm at a minimum distance from an imaging surface of the imaging lens assembly to an object-side surface of the first lens on the optical axis, TSmax, a distance from the movable diaphragm at a maximum distance from the imaging surface of the imaging lens assembly to the object-side surface of the first lens on the optical axis and CT1, a center thickness of the first lens on the optical axis meet 1.0<(|TSmin|+|TSmax|)/CT1<1.5.

20 Claims, 34 Drawing Sheets

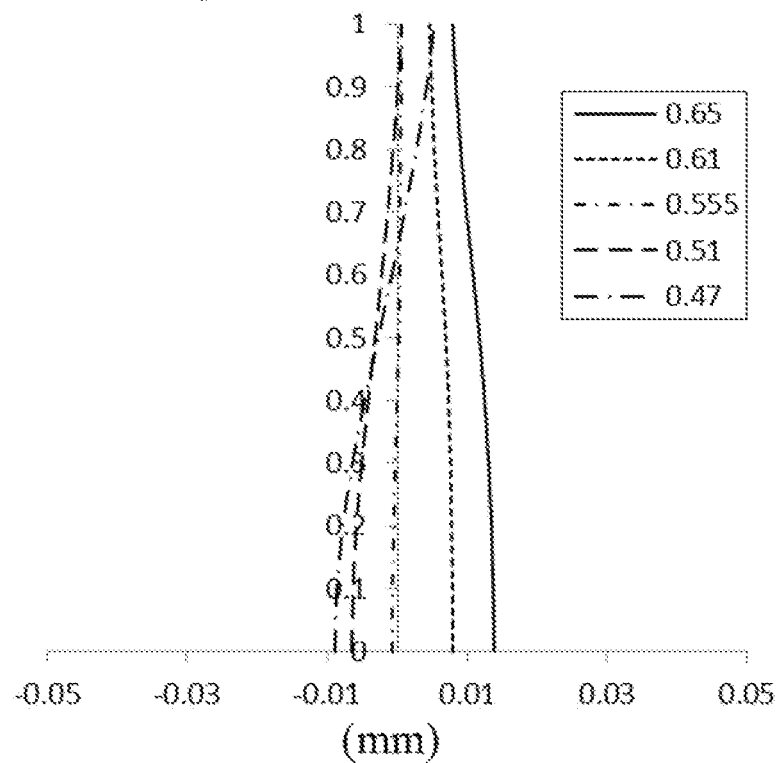

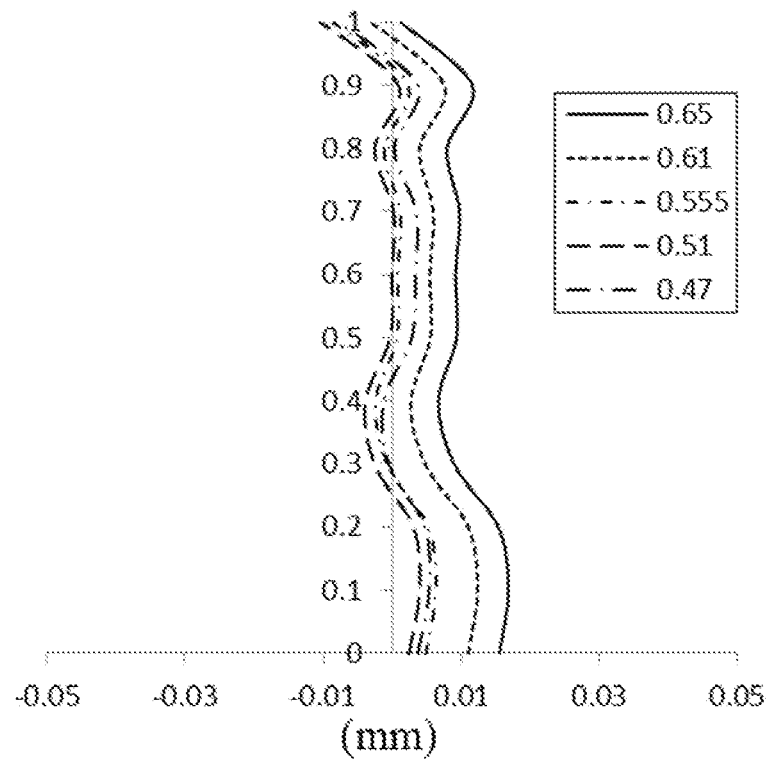

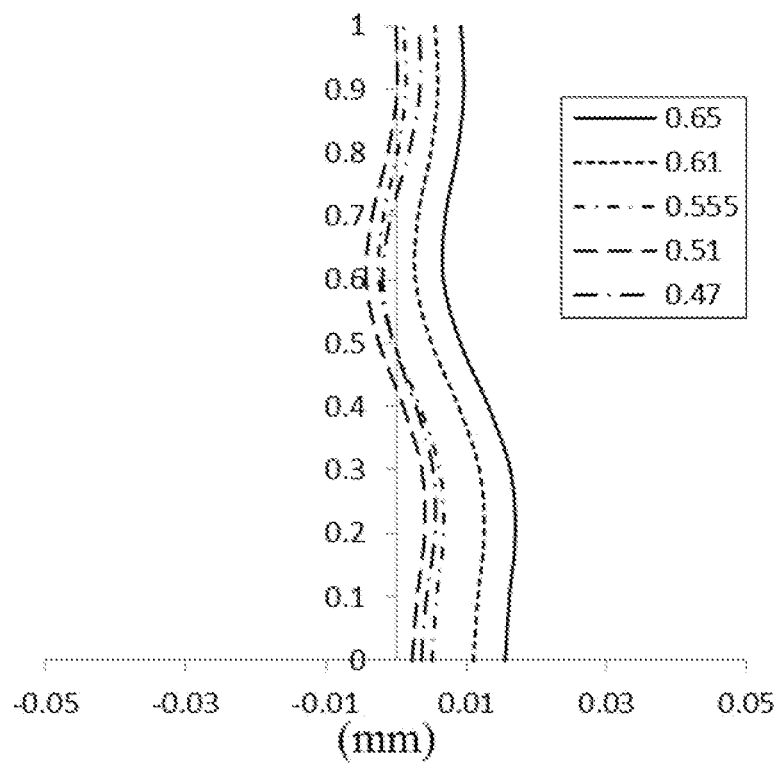

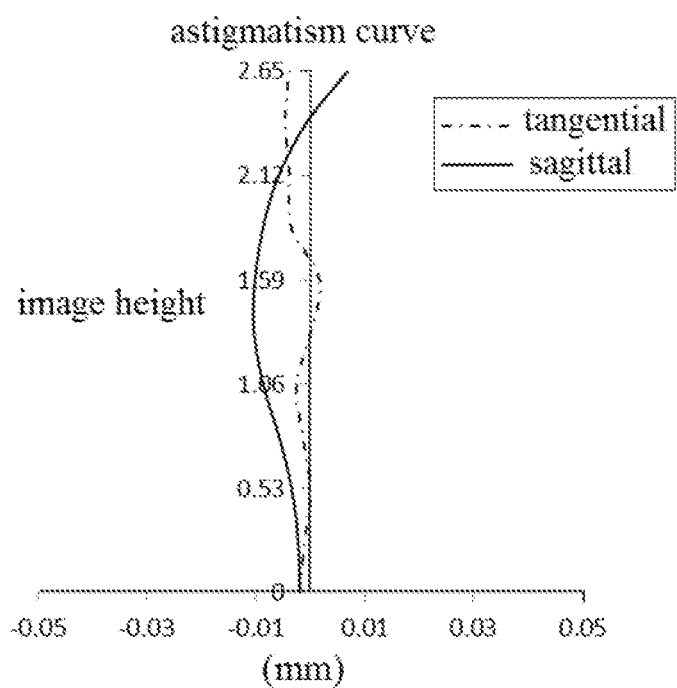

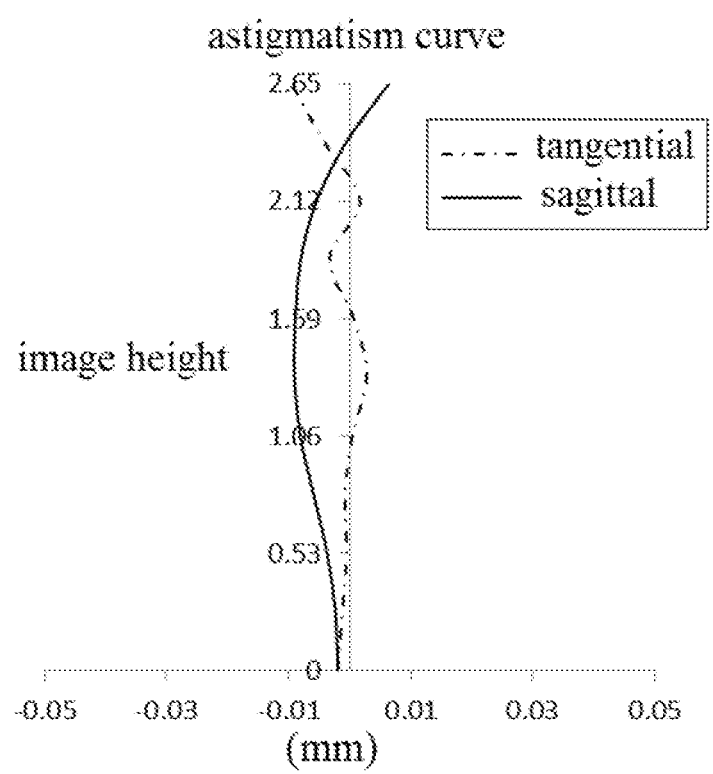

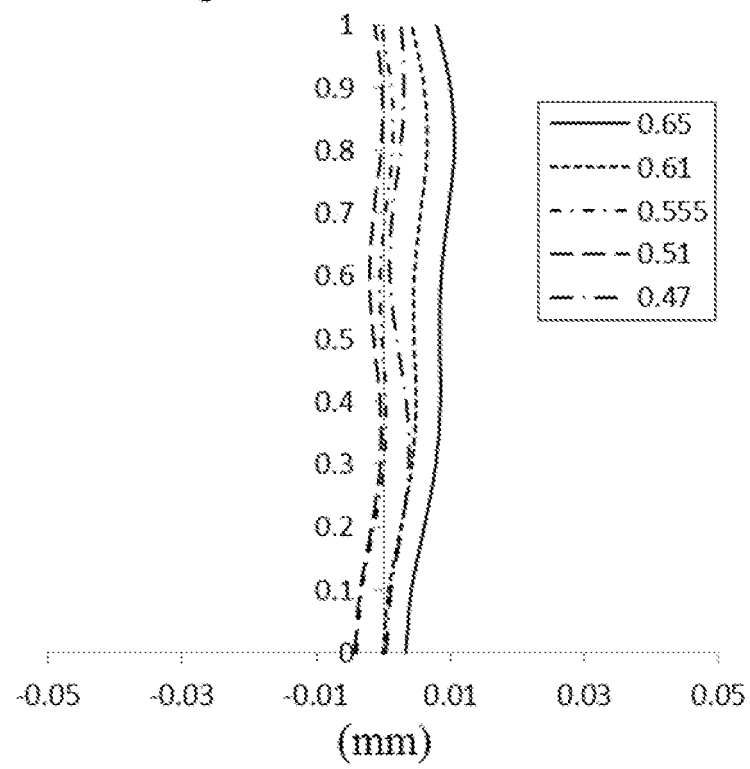

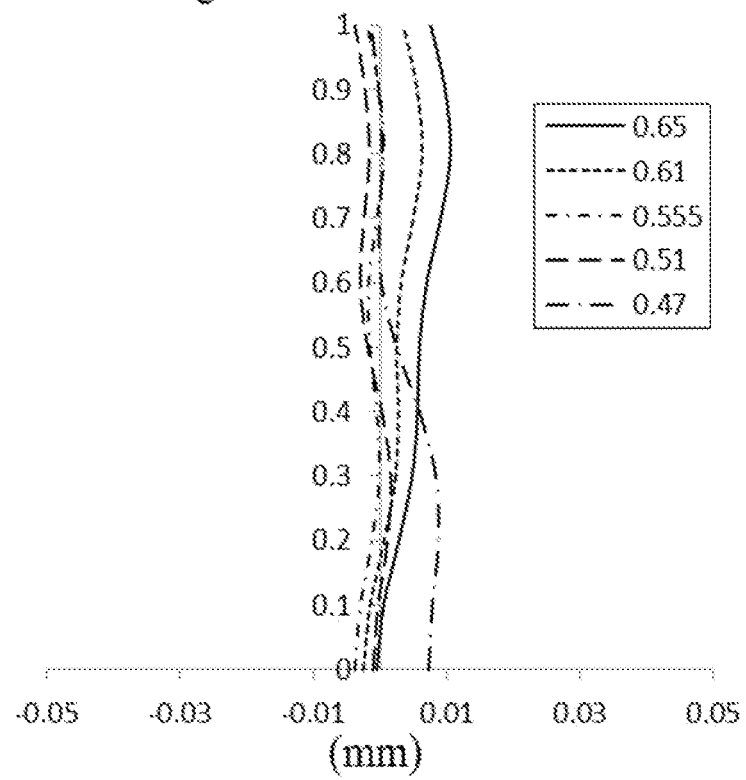

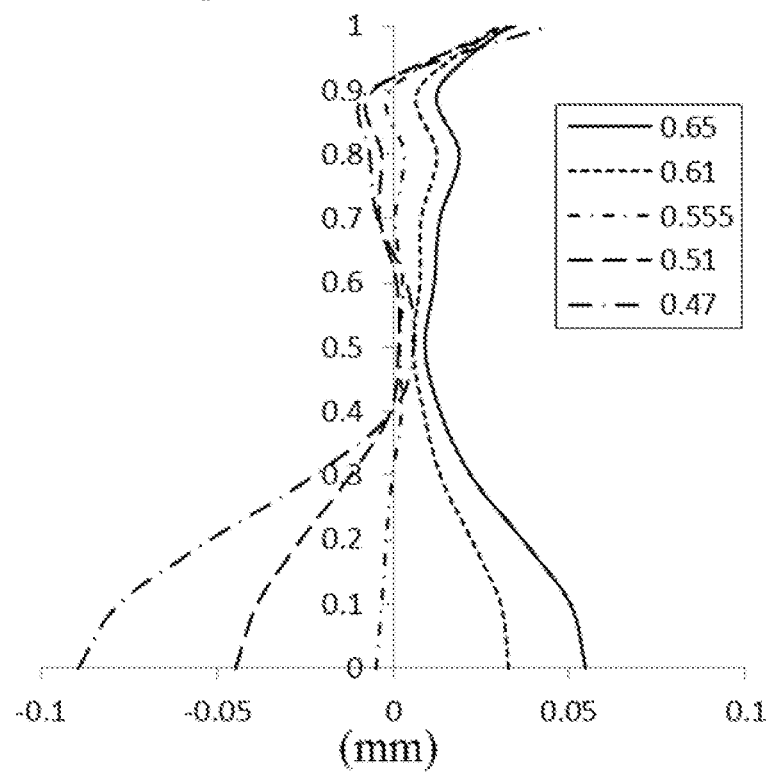

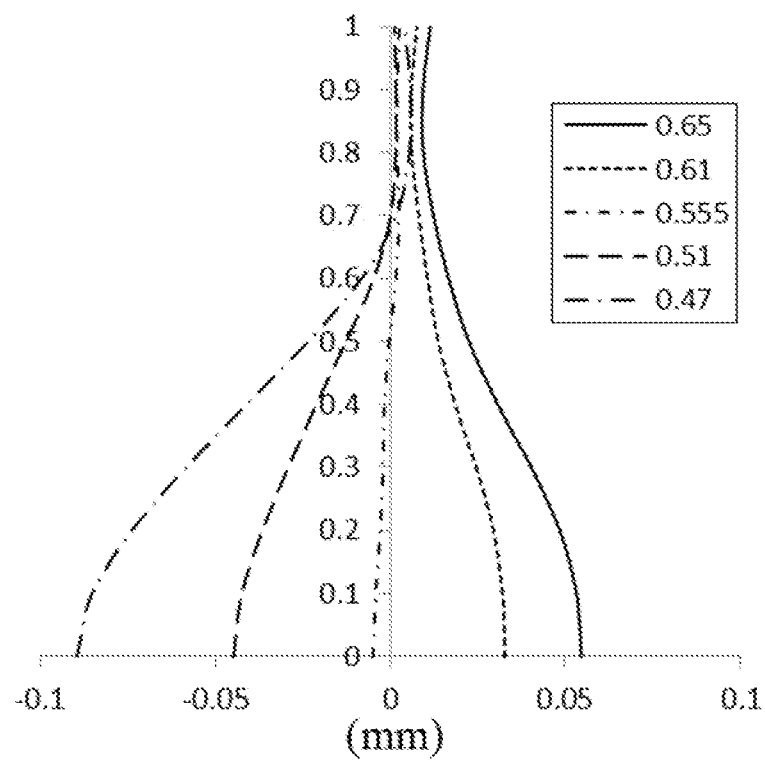

IMAGING LENS ASSEMBLY

CROSS-REFERENCE TO RELATED APPLICATION(S)

The disclosure claims priority to Chinese Patent Application No. 202010630774.8, filed on Jul. 3, 2020, and entitled "Imaging Lens Assembly", the disclosure of which is hereby incorporated by reference in its entirety.

TECHNICAL FIELD

The disclosure relates to the field of optical elements, and particularly to an imaging lens assembly.

BACKGROUND

In recent years, with the rapid development of portable electronic products such as smart phones, imaging lens assemblies applied to portable electronic products such as smart phones have also been developed rapidly, users have made more and more requirements on imaging lens assemblies applied to portable electronic products such as smart phones, and meanwhile, imaging lens assemblies with characteristics of ultra-thin design, long focal length, ultra-long focal length, periscopic long focal length, wide angle and the like have gradually been presented to users.

With the increase of requirements of users on functions of imaging lenses of portable electronic products such as smart phones, how to achieve an effect of a relatively large depth of field during shooting of a portrait on the basis of achieving a small size and compact structure of a lens is a goal pursued by many users at present.

SUMMARY

Some embodiments of the disclosure provide an imaging lens assembly, which sequentially includes, from an object side to an image side along an optical axis, a movable diaphragm, a first lens with a positive refractive power, a second lens with a refractive power, a third lens with a refractive power, a fourth lens with a positive refractive power and a fifth lens with a refractive power, wherein an effective focal length f1 of the first lens and an effective focal length f4 of the fourth lens meet $1.0<f4/f1<2.3$; and TSmin, a distance from the movable diaphragm at a minimum distance from an imaging surface of the imaging lens assembly to an object-side surface of the first lens on the optical axis, TSmax, a distance from the movable diaphragm at a maximum distance from the imaging surface of the imaging lens assembly to the object-side surface of the first lens on the optical axis and CT1, a center thickness of the first lens on the optical axis meet $1.0<(|TSmin|+|TSmax|)/CT1<1.5$.

In an implementation mode, the object-side surface of the first lens to an image-side surface of the fifth lens include at least one aspherical mirror surface.

In an implementation mode, SAG41, a distance from an intersection point of an object-side surface of the fourth lens and the optical axis to a maximum effective radius vertex of the object-side surface of the fourth lens on the optical axis, SAG42, a distance from an intersection point of an image-side surface of the fourth lens and the optical axis to a maximum effective radius vertex of the image-side surface of the fourth lens on the optical axis and DT42, a maximum effective radius of the image-side surface of the fourth lens meet $0.7<(SAG41+SAG42)/DT42<1.0$.

In an implementation mode, SAG41, a distance from an intersection point of the object-side surface of the fourth lens and the optical axis to a maximum effective radius vertex of the object-side surface of the fourth lens on the optical axis and SAG42, a distance from an intersection point of the image-side surface of the fourth lens and the optical axis to a maximum effective radius vertex of the image-side surface of the fourth lens on the optical axis meet $0.8<SAG42/SAG41\le0.3$.

In an implementation mode, SAG22, a distance from an intersection point of an image-side surface of the second lens and the optical axis to a maximum effective radius vertex of the image-side surface of the second lens on the optical axis and CT2, a center thickness of the second lens on the optical axis meet $1.0<SAG22/CT2<1.5$.

In an implementation mode, SAG41, a distance from an intersection point of an object-side surface of the fourth lens and the optical axis to a maximum effective radius vertex of the object-side surface of the fourth lens on the optical axis, T45, a spacing distance of the fourth lens and the fifth lens on the optical axis and CT4, a center thickness of the fourth lens on the optical axis meet $1.0<(T45-SAG41)/CT4<1.5$.

In an implementation mode, the effective focal length f4 of the fourth lens, a radius of curvature R7 of an object-side surface of the fourth lens and a radius of curvature R8 of an image-side surface of the fourth lens meet $1.0<f4/(R7+R8)<4.0$.

In an implementation mode, a total effective focal length f of the imaging lens assembly, a radius of curvature R5 of an object-side surface of the third lens and a radius of curvature R6 of an image-side surface of the third lens meet $2.0<f/R5+f/R6<3.5$.

In an implementation mode, CT3, a center thickness of the third lens on the optical axis and CT1, a center thickness of the first lens on the optical axis meet $0.5<CT3/CT1<1.0$.

In an implementation mode, DT11, a maximum effective radius of the object-side surface of the first lens and DT52, a maximum effective radius of an image-side surface of the fifth lens meet $1.0<DT11/DT52<1.3$.

In an implementation mode, DT42, a maximum effective radius of an image-side surface of the fourth lens and DT52, a maximum effective radius of an image-side surface of the fifth lens meet $0.9<DT42/DT52<1.1$.

In an implementation mode, EPDmax, a maximum Entrance Pupil Diameter (EPD) of the imaging lens assembly and ImgH, a half of a diagonal length of an effective pixel region on the imaging surface of the imaging lens assembly meet $EPDmax/ImgH<2.5$.

Some embodiments of the disclosure provide an imaging lens assembly, which sequentially includes, from an object side to an image side along an optical axis, a movable diaphragm, a first lens with a positive refractive power, a second lens with a refractive power, a third lens with a refractive power, a fourth lens with a positive refractive power and a fifth lens with a refractive power, wherein TSmin, a distance from the movable diaphragm at a minimum distance from an imaging surface of the imaging lens assembly to an object-side surface of the first lens on the optical axis, TSmax, a distance from the movable diaphragm at a maximum distance from the imaging surface of the imaging lens assembly to the object-side surface of the first lens on the optical axis and CT1, a center thickness of the first lens on the optical axis meet $1.0<(|TSmin|+|TSmax|)/CT1<1.5$; and SAG41, a distance from an intersection point of an object-side surface of the fourth lens and the optical axis to a maximum effective radius vertex of the object-side surface of the fourth lens on the optical axis, SAG42, a distance from an intersection point of an image-side surface of the fourth lens and the optical axis to a maximum effective radius vertex of the image-side surface of the fourth lens on the optical axis and a maximum effective radius DT42 of the image-side surface of the fourth lens meet $0.7<(SAG41+SAG42)/DT42<1.0$.

According to some embodiments of the disclosure, multiple (for example, five) lenses are adopted, and the refractive power and surface types of each lens, the center thickness of each lens, on-axis distances between the lenses and the like are reasonably configured to achieve at least one beneficial effect of small size, large depth of field, high imaging quality and the like of the imaging lens assembly.

BRIEF DESCRIPTION OF THE DRAWINGS

Detailed descriptions made to unrestrictive implementation modes with reference to the following drawings are read to make the other characteristics, purposes and advantages of the disclosure more apparent.

FIG. 4A to FIG. 4C illustrate a longitudinal aberration curve, astigmatism curve and distortion curve of an imaging lens assembly of which a movable diaphragm is at a maximum distance from an imaging surface of the imaging lens assembly on an optical axis according to embodiment 1 respectively;

FIG. 7A to FIG. 7C illustrate a longitudinal aberration curve, astigmatism curve and distortion curve of an imaging lens assembly when a movable diaphragm is at a minimum distance from an imaging surface of the imaging lens on an optical axis according to embodiment 2 respectively;

FIG. 8A to FIG. 8C illustrate a longitudinal aberration curve, astigmatism curve and distortion curve of an imaging lens assembly, when a movable diaphragm is at a maximum distance from an imaging surface of the imaging lens on an optical axis according to embodiment 2 respectively;

FIG. 11A to FIG. 11C illustrate a longitudinal aberration curve, astigmatism curve and distortion curve of an imaging lens assembly of which a movable diaphragm is at a minimum distance from an imaging surface of the imaging lens assembly on an optical axis according to embodiment 3 respectively;

FIG. 12A to FIG. 12C illustrate a longitudinal aberration curve, astigmatism curve and distortion curve of an imaging lens assembly of which a movable diaphragm is at a maximum distance from an imaging surface of the imaging lens assembly on an optical axis according to embodiment 3 respectively;

FIG. 20A to FIG. 20C illustrate a longitudinal aberration curve, astigmatism curve and distortion curve of an imaging lens assembly of which a movable diaphragm is at a maximum distance from an imaging surface of the imaging lens assembly on an optical axis according to embodiment 5 respectively;

FIG. 24A to FIG. 24C illustrate a longitudinal aberration curve, astigmatism curve and distortion curve of an imaging lens assembly of which a movable diaphragm is at a maximum distance from an imaging surface of the imaging lens assembly on an optical axis according to embodiment 6 respectively;

FIG. 27A to FIG. 27C illustrate a longitudinal aberration curve, astigmatism curve and distortion curve of an imaging lens assembly of which a movable diaphragm is at a minimum distance from an imaging surface of the imaging lens assembly on an optical axis according to embodiment 7 respectively; and FIG. 28A to FIG. 28C illustrate a longitudinal aberration curve, astigmatism curve and distortion curve of an imaging lens assembly of which a movable diaphragm is at a maximum distance from an imaging surface of the imaging lens assembly on an optical axis according to embodiment 7 respectively.

DETAILED DESCRIPTION OF THE EMBODIMENTS

Figure 1:
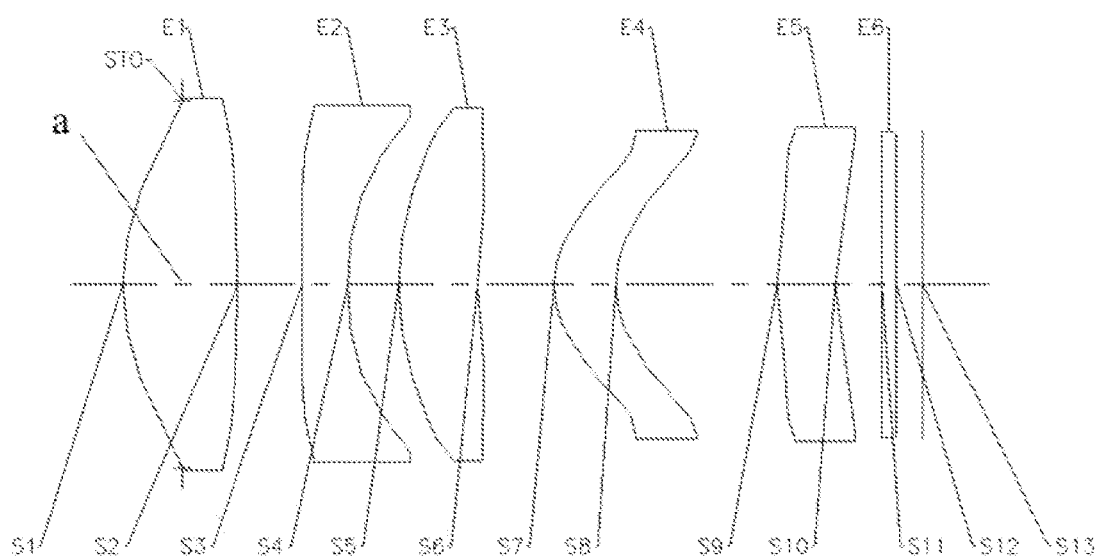
FIG. 1 illustrates a structure diagram of an imaging lens assembly according to embodiment 1 of the disclosure, wherein a movable diaphragm is at a minimum distance from an imaging surface of the imaging lens assembly.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspherical shape shown in the drawings is shown by some embodiments. That is, the spherical shape or the aspherical shape is not limited to the spherical shape or aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An imaging lens assembly according to an exemplary implementation mode of the disclosure includes five lenses with refractive power, i.e., a first lens, a second lens, a third lens, a fourth lens and a fifth lens respectively. The five lenses are sequentially arranged from an object side to an image side along an optical axis. In the first lens to the fifth lens, there is a spacing distance between any two adjacent lenses.

In the exemplary implementation mode, the first lens has a positive refractive power; the second lens has a positive refractive power or a negative refractive power; the third lens has a positive refractive power or a negative refractive power; the fourth lens has a positive refractive power; and the fifth lens has a positive refractive power or a negative refractive power.

In the exemplary implementation mode, the imaging lens assembly according to the disclosure meets $1.0<f4/f1<2.3$, wherein f1 is an effective focal length of the first lens, and f4 is an effective focal length of the fourth lens. More specifically, f1 and f4 further meet $1.2<f4/f1<2.2$. $1.0<f4/f1<2.3$ is met, so that a relatively large total effective focal length of the system is ensured effectively.

Figure 2:
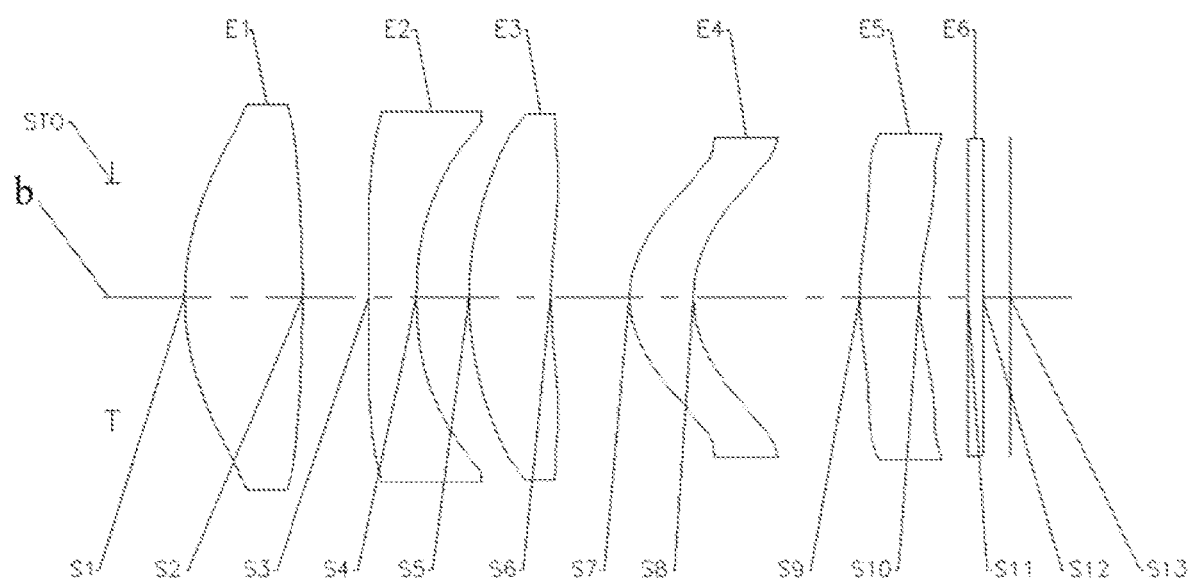
FIG. 2 illustrates a structure diagram of an imaging lens assembly according to embodiment 1 of the disclosure, wherein a movable diaphragm is at a maximum distance from an imaging surface of the imaging lens assembly.

In the exemplary implementation mode, the imaging lens assembly according to the disclosure further includes a movable diaphragm arranged between the object side and the first lens. As shown in FIG. 1 and FIG. 2, the movable diaphragm is arranged in a manner of sliding along the optical axis. Specifically, the movable diaphragm slides between a position a at a minimum distance from an imaging surface of the imaging lens assembly and a position b at a maximum distance from the imaging surface of the imaging lens assembly. Specifically, the movable diaphragm may move to the position a at the minimum distance from the imaging surface of the imaging lens, as shown in FIG. 1. The movable diaphragm may move to the position b at the maximum distance from the imaging surface of the imaging lens, as shown in FIG. 2. Under the condition that the imaging lens assembly has a relatively large total effective focal length, a moving range of the movable diaphragm is relatively large, and an f-number of the system changes in a relatively large range.

In the exemplary implementation mode, the imaging lens assembly according to the disclosure meets $1.0<(|TSmin|+|TSmax|)/CT1<1.5$, wherein TSmin is a distance from the movable diaphragm at the minimum distance from the imaging surface of the imaging lens assembly to an object-side surface of the first lens on the optical axis, TSmax is a distance from the movable diaphragm at the maximum distance from the imaging surface of the imaging lens assembly to the object-side surface of the first lens on the optical axis, and CT1 is a center thickness of the first lens on the optical axis. More specifically, TSmin, TSmax and CT1 further meet $1.0<(|TSmin|+|TSmax|)/CT1<1.4$. $1.0<(|TSmin|+|TSmax|)/CT1<1.5$ is met, so that a position of the movable diaphragm is controlled in a reasonable range, and under the condition of a certain total effective focal length of the imaging lens assembly, the f-number of the imaging lens assembly is switched between different values to meet a requirement on a large depth of field during shooting of a portrait.

In the exemplary implementation mode, the imaging lens assembly according to the disclosure meets $0.7<(SAG41+SAG42)/DT42<1.0$, wherein SAG41 is a distance from an intersection point of an object-side surface of the fourth lens and the optical axis to a maximum effective radius vertex of the object-side surface of the fourth lens on the optical axis, SAG42 is a distance from an intersection point of an image-side surface of the fourth lens and the optical axis to a maximum effective radius vertex of the image-side surface of the fourth lens on the optical axis, and DT42 is a maximum effective radius of the image-side surface of the fourth lens. $0.7<(SAG41+SAG42)/DT42<1.0$ is met, so that a shape of the fourth lens is restricted effectively, a ghost image risk is reduced, difficulties in machining are reduced, and a spherical aberration of the imaging lens assembly is compensated.

In the exemplary implementation mode, the imaging lens assembly according to the disclosure meets $0.8<SAG42/SAG41\le1.3$, wherein SAG41 is a distance from an intersection point of an object-side surface of the fourth lens and the optical axis to a maximum effective radius vertex of the object-side surface of the fourth lens on the optical axis, and SAG42 is a distance from an intersection point of an image-side surface of the fourth lens and the optical axis to a maximum effective radius vertex of the image-side surface of the fourth lens on the optical axis. $0.8<SAG42/SAG4151\le0.3$ is met, so that the fourth lens is prevented from being curved excessively, difficulties in machining are reduced, and the spherical aberration of the imaging lens assembly is compensated.

In the exemplary implementation mode, the imaging lens assembly according to the disclosure meets $1.0<SAG22/CT2<1.5$, wherein SAG22 is a distance from an intersection point of an image-side surface of the second lens and the optical axis to a maximum effective radius vertex of the image-side surface of the second lens on the optical axis, and CT2 is a center thickness of the second lens on the optical axis. $1.0<SAG22/CT2<1.5$ is met, so that the field curvature sensitivity of the whole lens is improved effectively, and astigmatism and coma contributions of the second lens to the whole system are reduced.

In the exemplary implementation mode, the imaging lens assembly according to the disclosure meets $1.0<(T45-SAG41)/CT4<1.5$, wherein SAG41 is the distance from the intersection point of the object-side surface of the fourth lens and the optical axis to the maximum effective radius vertex of the object-side surface of the fourth lens on the optical axis, T45 is a spacing distance of the fourth lens and the fifth lens on the optical axis, and CT4 is a center thickness of the fourth lens on the optical axis. $1.0<(T45-SAG41)/CT4<1.5$ is met, so that not only the ghost image risk brought by the fourth lens and the fifth lens is reduced effectively, but also a size of the imaging lens assembly is reduced to implement miniaturization of the lens.

In the exemplary implementation mode, the imaging lens assembly according to the disclosure meets $1.0<f4/(R7+R8)<4.0$, wherein f4 is an effective focal length of the fourth lens, R7 is a radius of curvature of an object-side surface of the fourth lens, and R8 is a radius of curvature of an image-side surface of the fourth lens. More specifically, f4, R7 and R8 further meet $2.4<f4/(R7+R8)<4.0$. $1.0<f4/(R7+R8)<4.0$ is met, so that a deflection angle of an edge field of View (FOV) at the fourth lens is controlled, and the sensitivity of the system is reduced effectively.

In the exemplary implementation mode, the imaging lens assembly according to the disclosure meets $2.0<f/R5+f/R6<3.5$, wherein f is a total effective focal length of the imaging lens assembly, R5 is a radius of curvature of an object-side surface of the third lens, and R6 is a radius of curvature of an image-side surface of the third lens. More specifically, f, R5 and R6 further meet $2.1<f/R5+f/R6<3.2$. $2.0<f/R5+f/R6<3.5$ is met, so that a spherical aberration generated by previous and next lenses is balanced better, to further regulate the spherical aberration of the system and reduce an aberration in an on-axis FOV.

In the exemplary implementation mode, the imaging lens assembly according to the disclosure meets $0.5<CT3/CT1<1.0$, wherein CT3 is a center thickness of the third lens on the optical axis, and CT1 is a center thickness of the first lens on the optical axis. $0.5<CT3/CT1<1.0$ is met, so that distortion contributions of the first lens and the third lens are controlled in a reasonable range, and furthermore, a final distortion in each FOV is controlled in a relatively small numerical range to avoid a post software debugging requirement.

In the exemplary implementation mode, the imaging lens assembly according to the disclosure meets $1.0<DT11/DT52<1.3$, wherein DT11 is a maximum effective radius of an object-side surface of the first lens, and DT52 is a maximum effective radius of an image-side surface of the fifth lens. More specifically, DT11 and DT52 may further meet $1.1<DT11/DT52<1.3$. $1.0<DT11/DT52<1.3$ is met, so that the size of the lens assembly is reduced to implement miniaturization of the lens assembly, and resolving power is improved.

In the exemplary implementation mode, the imaging lens assembly according to the disclosure meets $0.9<DT42/DT52<1.1$, wherein DT42 is a maximum effective radius of an image-side surface of the fourth lens, and DT52 is a maximum effective radius of an image-side surface of the fifth lens. $0.9<DT42/DT52<1.1$ is met, so that the size of the lens assembly is reduced to implement miniaturization of the lens assembly, difficulties in machining are reduced, and the resolving power is improved.

In the exemplary implementation mode, the imaging lens assembly according to the disclosure meets $EPDmax/ImgH<2.5$, wherein EPDmax is a maximum EPD (i.e. Entrance Pupil Diameter) of the imaging lens assembly, i.e., an EPD when the movable diaphragm is at the minimum distance from the imaging surface of the imaging lens assembly, and ImgH is a half of a diagonal length of an effective pixel region on the imaging surface of the imaging lens assembly. Meeting EPDmax/ImgH<2.5 is favorable for the diaphragm to move in a reasonable range on the premise that the diaphragm is movable, and meanwhile, ensures a relatively large f-number of the system.

In the exemplary implementation mode, the imaging lens assembly according to the disclosure further includes an optical filter configured to correct a chromatic aberration and/or protective glass configured to protect a photosensitive element on the imaging surface. The imaging lens assembly according to the implementation mode of the disclosure adopts multiple lenses, for example, the abovementioned five. The refractive power and surface types of each lens, the center thickness of each lens, on-axis distances between the lenses and the like are reasonably configured to effectively reduce the size of the imaging lens assembly, improve the machinability of the imaging lens assembly and ensure that the imaging lens assembly is more favorable for production and machining and applicable to a portable electronic product. The imaging lens assembly as configured above has the characteristics of small size, compact structure, large depth of field, high imaging quality and the like, and meets using requirements of various portable electronic products in a shooting scenario.

In the implementation mode of the disclosure, at least one of mirror surfaces of each lens is an aspheric mirror surface, namely at least one mirror surface in the object-side surface of the first lens to the image-side surface of the fifth lens is an aspherical mirror surface. An aspherical lens has a characteristic that a curvature keeps changing continuously from a center of the lens to a periphery of the lens. Unlike a spherical lens with a constant curvature from a center of the lens to a periphery of the lens, the aspherical lens has a better radius of curvature characteristic and the advantages of improving distortions and improving astigmatic aberrations. With adoption of the aspherical lens, astigmatic aberrations during imaging are eliminated as much as possible to further improve the imaging quality. In some implementation modes, at least one of the object-side surface and image-side surface of each lens in the first lens, the second lens, the third lens, the fourth lens and the fifth lens is an aspherical mirror surface. In some implementation modes, both the object-side surface and image-side surface of each lens in the first lens, the second lens, the third lens, the fourth lens and the fifth lens are aspherical mirror surfaces.

However, those skilled in the art should know that the number of the lenses forming the imaging lens may be changed without departing from the technical solutions claimed in the disclosure to achieve each result and advantage described in the specification. For example, although descriptions are made in the implementation with five lenses as an example, the imaging lens is not limited to five lenses. If necessary, the imaging lens may further include another number of lenses.

Specific embodiments applied to the imaging lens assembly of the abovementioned implementation mode will further be described below with reference to the drawings.

Embodiment 1

An imaging lens assembly according to embodiment 1 of the disclosure will be described below with reference to FIG. 1 to FIG. 4C. FIG. 1 and FIG. 2 are structure diagrams of an imaging lens assembly of which a movable diaphragm is at a minimum distance and a maximum distance from an imaging surface of the imaging lens assembly according to embodiment 1 of the disclosure respectively.

As shown in FIG. 1 and FIG. 2, the imaging lens assembly sequentially includes, from an object side to an image side, a movable diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a convex surface. The second lens E2 has a negative refractive power, an object-side surface S3 thereof is a concave surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially passes through each of the surfaces S1 to S12 and is finally imaged on the imaging surface S13.

Table 1 is a basic parameter table of the imaging lens assembly of embodiment 1, and units of the radius of curvature, the thickness/distance and the focal length are all millimeter (mm).

TABLE 1

| Surface number | Surface type | Radius of curvature | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspherical | 5.1018 | 1.6500 | 1.546 | 56.14 | 8.31 | 0.3337 |
| S2 | Aspherical | −22.8684 | 0.9239 | | | | 0.0000 |
| S3 | Aspherical | −26.8433 | 0.6599 | 1.645 | 23.53 | −10.02 | 67.7690 |
| S4 | Aspherical | 5.0946 | 0.7293 | | | | 0.0000 |
| S5 | Aspherical | 6.9949 | 1.1313 | 1.546 | 56.14 | 1000.00 | 0.0315 |
| S6 | Aspherical | 6.6810 | 1.1043 | | | | 2.3336 |
| S7 | Aspherical | 1.9120 | 0.8883 | 1.546 | 56.14 | 11.08 | −1.2120 |
| S8 | Aspherical | 2.3375 | 2.3111 | | | | −0.4354 |
| S9 | Aspherical | 5.5929 | 0.8395 | 1.667 | 20.37 | −27.09 | −12.5525 |
| S10 | Aspherical | 4.0144 | 0.6698 | | | | −8.8895 |
| S11 | Spherical | Infinite | 0.2100 | 1.518 | 64.17 | | |
| S12 | Spherical | Infinite | 0.3826 | | | | |
| S13 | Spherical | Infinite | | | | | |

In the example, a total effective focal length f of the imaging lens assembly is 9.08 mm, TSmin, a distance from the movable diaphragm at the minimum distance from the imaging surface of the imaging lens assembly to an object-side surface of the first lens on an optical axis is −0.8606 mm, TSmax, a distance from the movable diaphragm at the maximum distance from the imaging surface of the imaging lens assembly to the object-side surface of the first lens on the optical axis is 1.0000 mm, FNOmin, an f-number of the imaging lens assembly when the distance from the movable diaphragm to the imaging surface of the imaging lens assembly on the optical axis is minimum is 1.43, FNOmax, an f-number of the imaging lens assembly when the distance from the movable diaphragm to the imaging surface of the imaging lens assembly on the optical axis is maximum is 2.41, and a maximum FOV of the imaging lens assembly is 32.3°.

In embodiment 1, both the object-side surface and image-side surface of any lens in the first lens E1 to the fifth lens E5 are aspherical surfaces, and a surface type x of each aspherical lens is defined through, but not limited to, the following aspherical surface formula:

$$x = \frac{ch^2}{1 + \sqrt{1 - (k+1)c^2h^2}} + \sum A_i h^i, \quad (1)$$

wherein x is a distance vector height from a vertex of the aspherical surface when the aspherical surface is at a height of h along the optical axis direction; c is a paraxial curvature of the aspherical surface, c=1/R (namely, the paraxial curvature c is a reciprocal of the radius of curvature R in Table 1); k is a conic coefficient; and Ai is a correction coefficient of the i-th order of the aspherical surface. Table 2 shows high-order coefficients $A_4, A_6, A_8, A_{10}, A_{12}, A_{14}, A_{16}, A_{18}$ and $A_{20}$ applied to the aspherical mirror surfaces S1-S10 in embodiment 1.

TABLE 2

| Surface number | A4 | A6 | A8 | A10 | A12 |
|---|---|---|---|---|---|
| S1 | −2.7269E−01 | −3.7281E−02 | −7.3817E−03 | −1.2174E−03 | −2.5327E−04 |
| S2 | 2.1972E−01 | −6.8989E−02 | 1.6338E−02 | −4.3500E−04 | −7.6543E−04 |
| S3 | 5.0607E−01 | −3.0646E−02 | 1.7461E−02 | −2.5592E−03 | 8.1362E−04 |
| S4 | −2.2692E−02 | −8.6355E−02 | 3.4166E−02 | −4.6503E−02 | 1.1650E−02 |
| S5 | 6.1662E−02 | 5.6598E−03 | 2.2034E−02 | 5.4274E−04 | −1.7863E−03 |
| S6 | −8.4437E−01 | 8.4819E−02 | −4.9292E−03 | 6.3300E−03 | −1.9195E−03 |
| S7 | −3.3772E−01 | −8.7459E−02 | −2.3036E−02 | −2.1886E−04 | −2.0385E−03 |
| S8 | −4.5795E−01 | −1.2311E−01 | −1.1402E−02 | 7.2200E−04 | −1.7127E−03 |
| S9 | −2.6325E−01 | 6.3868E−02 | 8.6768E−03 | −1.2533E−03 | −4.7030E−04 |
| S10 | −3.3379E−01 | 6.0520E−02 | 2.0340E−02 | 1.0488E−03 | 3.9613E−05 |

| Surface number | A14 | A16 | A18 | A20 |
|---|---|---|---|---|
| S1 | −6.6137E−05 | −5.8607E−06 | −7.7589E−06 | 4.4449E−08 |
| S2 | 1.4789E−03 | −6.4586E−04 | 3.8259E−04 | −1.4540E−04 |
| S3 | 3.4001E−04 | −2.2181E−04 | 7.3563E−05 | 1.7277E−06 |
| S4 | −5.5444E−03 | 2.6931E−03 | 1.8273E−04 | −2.9031E−05 |
| S5 | 2.8024E−04 | −3.8362E−04 | −7.0075E−05 | −4.1012E−05 |
| S6 | 5.7066E−04 | −4.3235E−04 | −4.5571E−05 | −5.1640E−05 |
| S7 | −8.6787E−04 | −2.1770E−04 | −1.4951E−05 | −1.4429E−05 |
| S8 | −2.4966E−04 | 2.5315E−04 | 6.1870E−05 | −2.5668E−05 |
| S9 | −1.8719E−04 | 9.0117E−06 | 4.5475E−05 | −2.3952E−05 |
| S10 | −6.4734E−04 | −2.7023E−04 | −1.0835E−04 | −7.8031E−05 |

Figure 3A:
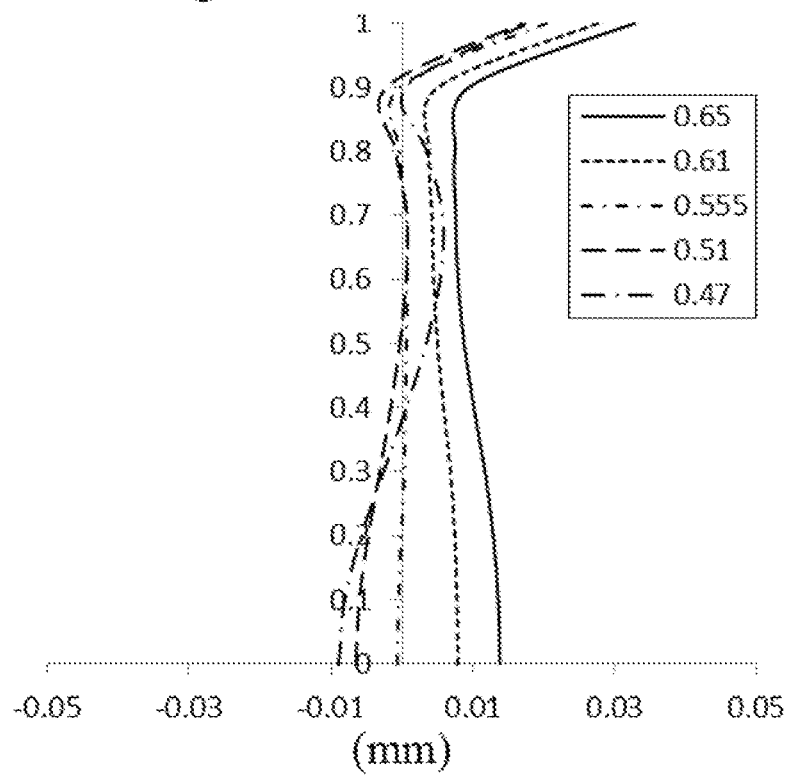
FIG. 3A to FIG. 3C illustrate a longitudinal aberration curve, astigmatism curve and distortion curve of an imaging lens assembly of which a movable diaphragm is at a minimum distance from an imaging surface of the imaging lens assembly on an optical axis according to embodiment 1 respectively.
Figure 3B:
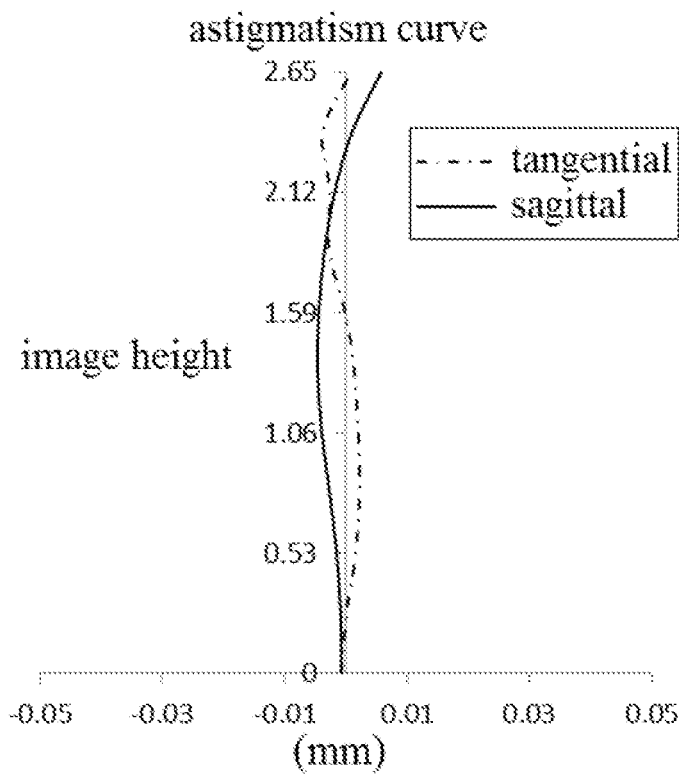
Figure 3C:
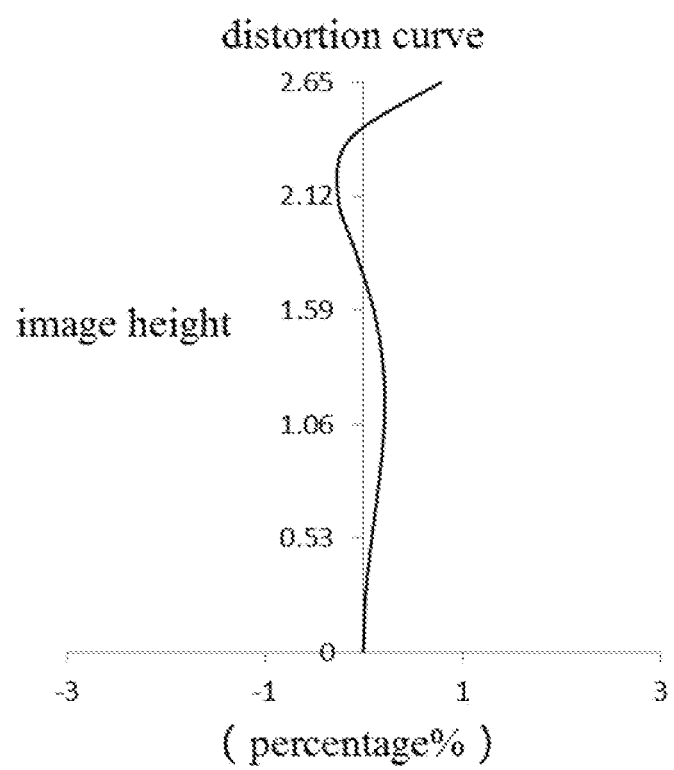
Figure 4B:
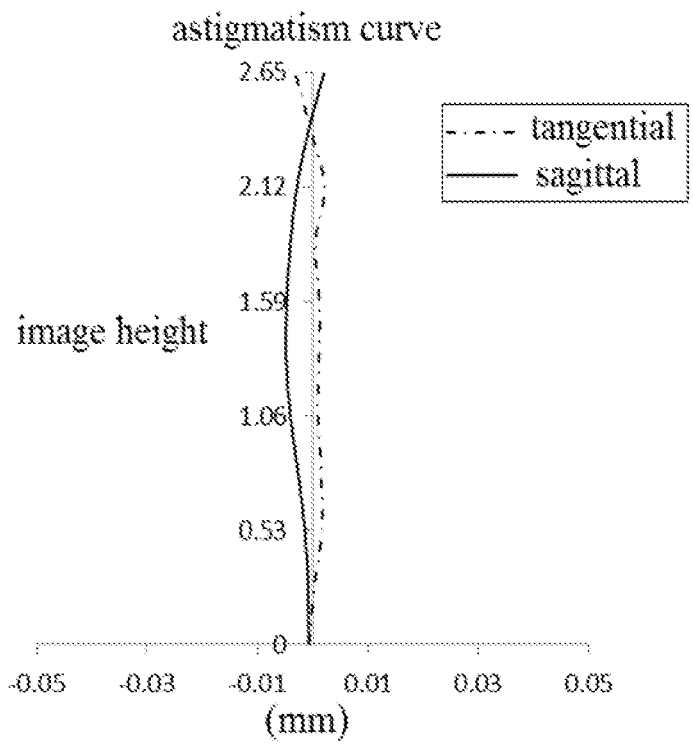
Figure 4C:
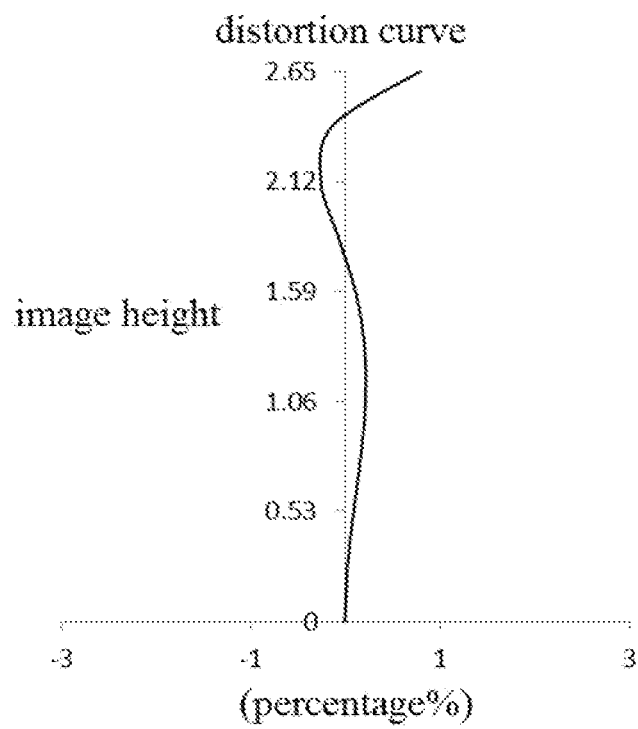

FIG. 3A and FIG. 4A show longitudinal aberration curves of the imaging lens assembly of which the movable diaphragm is at the minimum distance and the maximum distance from the imaging surface of the imaging lens assembly on the optical axis according to embodiment 1 respectively, to represent deviation of a convergence focal point after light with different wavelengths passes through the lens. FIG. 3B and FIG. 4B show astigmatism curves of the imaging lens assembly of which the movable diaphragm is at the minimum distance and the maximum distance from the imaging surface of the imaging lens assembly on the optical axis according to embodiment 1 respectively, to represent a tangential image surface curvature and a sagittal image surface curvature. FIG. 3C and FIG. 4C show distortion curves of the imaging lens assembly of which the movable diaphragm is at the minimum distance and the maximum distance from the imaging surface of the imaging lens assembly on the optical axis according to embodiment 1 respectively to represent distortion values corresponding to different image heights. According to FIG. 3A to FIG. 4C, it can be seen that the imaging lens assembly provided in embodiment 1 achieves high imaging quality.

Embodiment 2

Figure 5:
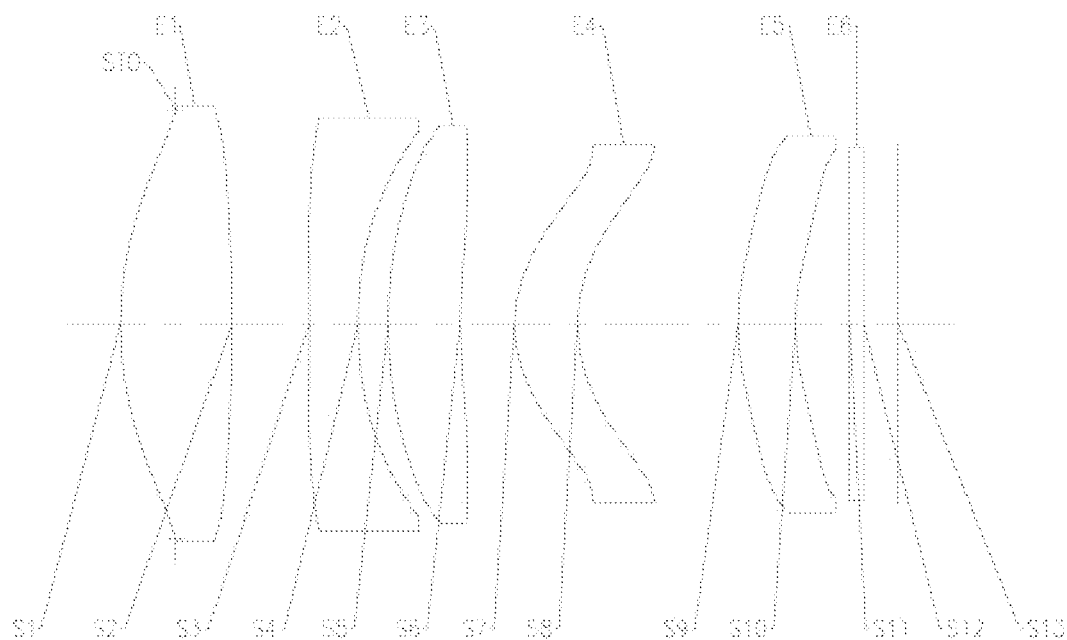
FIG. 5 illustrates a structure diagram of an imaging lens assembly according to embodiment 2 of the disclosure, wherein a movable diaphragm is at a minimum distance from an imaging surface of the imaging lens assembly.
Figure 6:
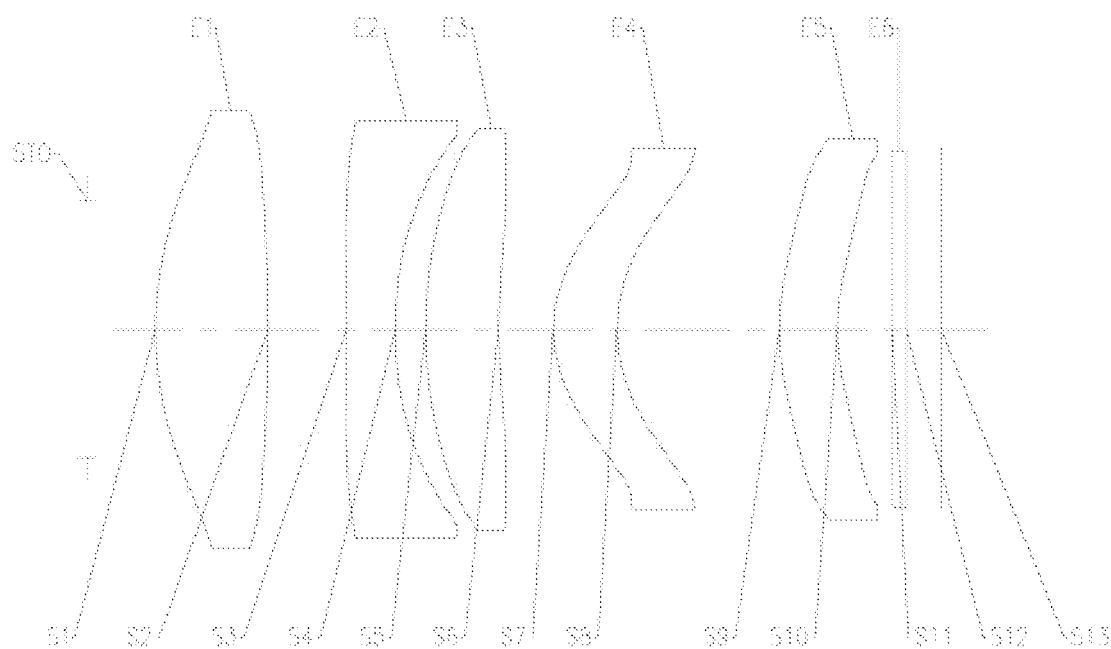
FIG. 6 illustrates a structure diagram of an imaging lens assembly according to embodiment 2 of the disclosure, wherein a movable diaphragm is at a maximum distance from an imaging surface of the imaging lens assembly.

An imaging lens assembly according to embodiment 2 of the disclosure will be described below with reference to FIG. 5 to FIG. 8C. In the embodiment and the following embodiments, part of descriptions similar to those about embodiment is omitted for simplicity. FIG. 5 and FIG. 6 are structure diagrams of an imaging lens assembly of which a movable diaphragm is at a minimum distance and a maximum distance from an imaging surface of the imaging lens assembly according to embodiment 2 of the disclosure respectively. As shown in FIG. 5 and FIG. 6, the imaging lens assembly sequentially includes, from an object side to an image side, a movable diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a convex surface. The second lens E2 has a negative refractive power, an object-side surface S3 thereof is a concave surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a convex surface, while an image-side surface S10 is a concave surface. The optical filter E6 has an object-side surface S11 and an image-side surface S12. Light from an object sequentially passes through each of the surfaces S1 to S12 and is finally imaged on the imaging surface S13.

In the example, a total effective focal length f of the imaging lens is 9.08 mm, TSmin, a distance from the movable diaphragm at the minimum distance from the imaging surface of the imaging lens assembly to the object-side surface of the first lens on an optical axis, is −0.8178 mm; TSmax, a distance from the movable diaphragm at the maximum distance from the imaging surface of the imaging lens assembly to the object-side surface of the first lens on the optical axis, is 1.0000 mm; FNOmin, an f-number of the imaging lens assembly when the distance from the movable diaphragm to the imaging surface of the imaging lens assembly on the optical axis is minimum is 1.43; FNOmax, an f-number of the imaging lens assembly when the distance from the movable diaphragm to the imaging surface of the imaging lens assembly on the optical axis is maximum is 2.41, and a maximum FOV of the imaging lens assembly is 32.0°.

Table 3 is a basic parameter table of the imaging lens assembly of embodiment 2, and units of the radius of curvature, the thickness/distance and the focal length are all mm. Table 4 shows high-order coefficients applied to each aspherical mirror surface in embodiment 2. A surface type of each aspherical surface is defined by the formula (1) given in embodiment 1.

TABLE 3

| Surface number | Surface type | Radius of curvature | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspherical | 5.2681 | 1.6500 | 1.546 | 56.14 | 8.13 | 0.3630 |
| S2 | Aspherical | −20.2374 | 1.1433 | | | | 0.0000 |
| S3 | Aspherical | −27.0157 | 0.7184 | 1.645 | 23.53 | −8.04 | 67.1149 |
| S4 | Aspherical | 4.9907 | 0.4458 | | | | 0.0000 |
| S5 | Aspherical | 7.0154 | 1.0633 | 1.546 | 56.14 | −9697.96 | 0.4042 |
| S6 | Aspherical | 6.6312 | 0.8017 | | | | 2.5046 |
| S7 | Aspherical | 1.8863 | 0.9338 | 1.546 | 56.14 | 10.31 | −1.2624 |
| S8 | Aspherical | 2.3417 | 2.3769 | | | | −0.4467 |
| S9 | Aspherical | 3.8748 | 0.8489 | 1.667 | 20.37 | 868.06 | −2.8592 |
| S10 | Aspherical | 5.6583 | 0.7991 | | | | 0.0000 |
| S11 | Spherical | Infinite | 0.2100 | 1.518 | 64.17 | | |
| S12 | Spherical | Infinite | 0.5089 | | | | |
| S13 | Spherical | Infinite | | | | | |

TABLE 4

| Surface number | A4 | A6 | A8 | A10 | A12 |
|---|---|---|---|---|---|
| S1 | −2.5956E−01 | −4.4544E−02 | −8.9406E−03 | −1.4299E−03 | −1.9806E−04 |
| S2 | 2.4567E−01 | −7.9953E−02 | 1.0810E−02 | −1.5953E−03 | 7.2407E−04 |
| S3 | 4.8256E−01 | −2.6870E−02 | 1.8172E−02 | 6.9694E−04 | 4.3394E−04 |
| S4 | −1.1635E−03 | −7.2657E−02 | 4.2729E−02 | −4.5099E−02 | 1.7141E−02 |
| S5 | 6.4243E−02 | 2.7257E−02 | 1.3262E−02 | 8.4665E−04 | −2.5535E−03 |
| S6 | −8.3414E−01 | 9.1135E−02 | −1.2404E−02 | 6.4140E−03 | −3.3525E−03 |
| S7 | −3.5997E−01 | −7.5818E−02 | −2.8439E−02 | 9.2460E−03 | −2.3361E−03 |
| S8 | −4.8102E−01 | −1.1501E−01 | −1.2550E−02 | 2.9941E−03 | −1.3669E−03 |
| S9 | −2.2902E−01 | 5.6778E−02 | 9.0680E−03 | −4.8259E−04 | −2.2853E−04 |
| S10 | −1.5274E−01 | 1.4822E−01 | 1.4362E−01 | −1.6739E−01 | 1.1853E−01 |

| Surface number | A14 | A16 | A18 | A20 |
|---|---|---|---|---|
| S1 | −8.3510E−06 | −1.1364E−05 | 8.1685E−06 | −2.3697E−05 |
| S2 | −2.0684E−04 | 1.2401E−05 | 1.1094E−05 | 1.3983E−05 |
| S3 | 4.5458E−04 | 2.5265E−04 | 2.5507E−04 | 5.9508E−05 |
| S4 | −4.0520E−03 | 4.8634E−05 | 1.8438E−03 | −6.3825E−04 |
| S5 | 2.4688E−04 | −6.3653E−04 | −6.4164E−05 | 1.7563E−05 |
| S6 | 8.0728E−04 | −9.2004E−04 | −7.2210E−05 | −1.3425E−04 |
| S7 | −8.0850E−04 | −3.0170E−04 | −7.1818E−05 | −2.3422E−05 |
| S8 | −3.2354E−04 | 1.7154E−04 | 4.5106E−05 | −9.2225E−06 |
| S9 | −1.4232E−04 | −5.7450E−06 | 3.1007E−05 | −1.0786E−05 |
| S10 | −6.4511E−02 | 2.7030E−02 | −8.7091E−03 | 1.1121E−03 |

Figure 7B:
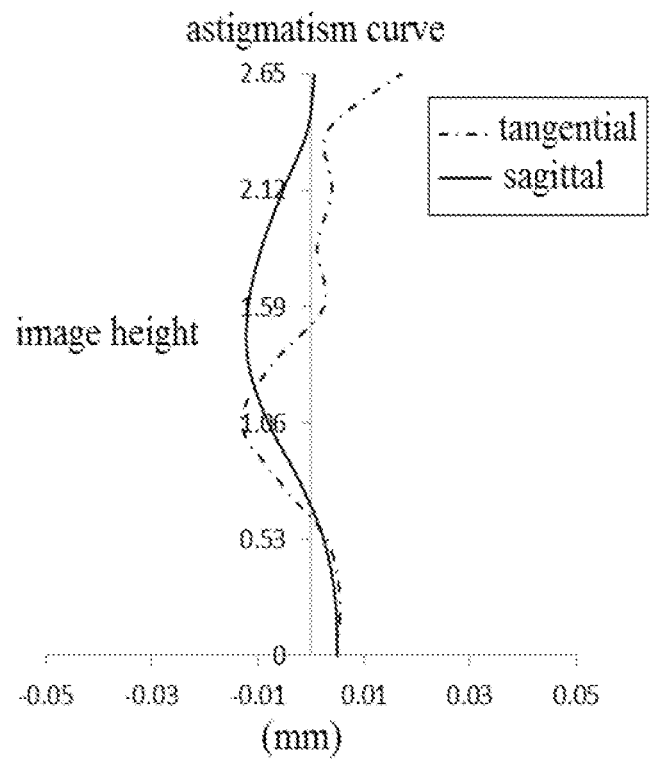
Figure 7C:
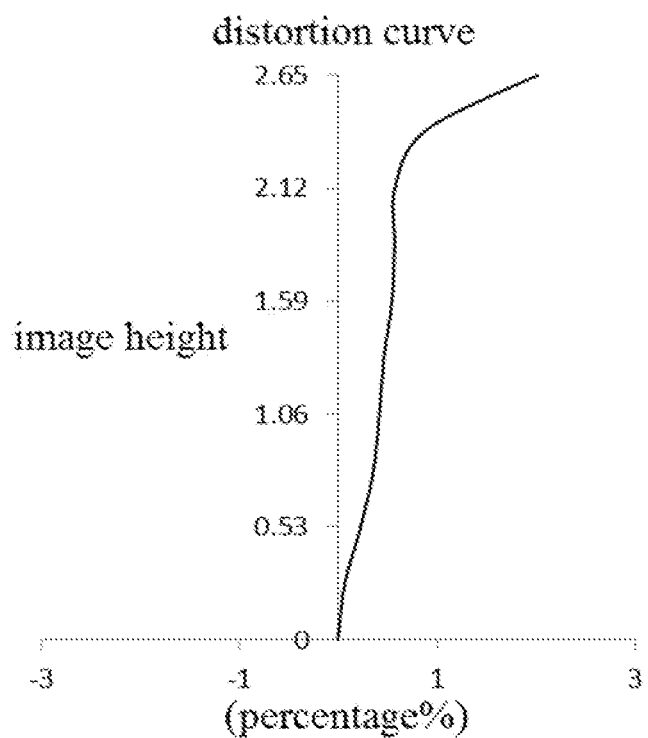
Figure 8B:
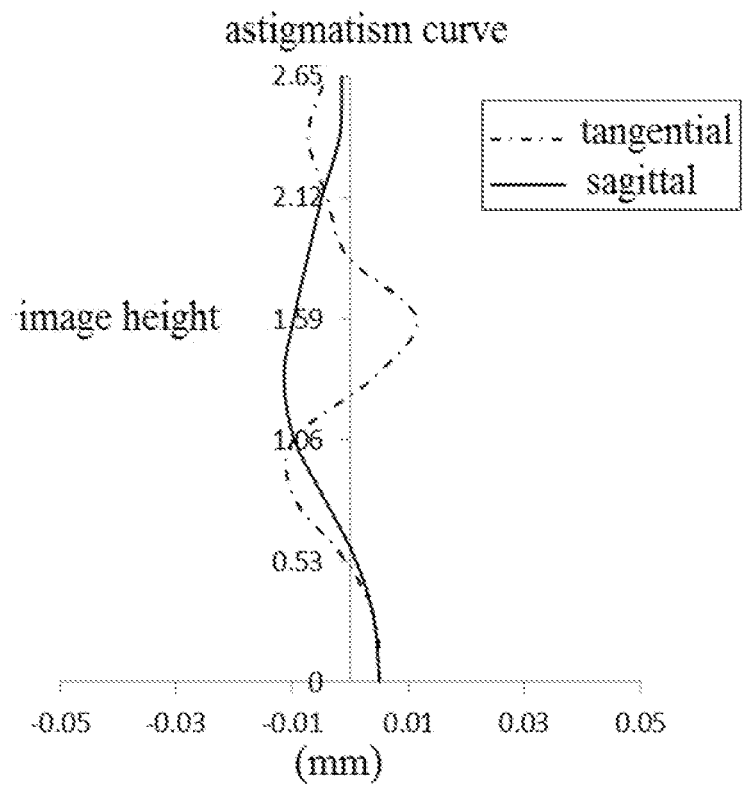
Figure 8C:
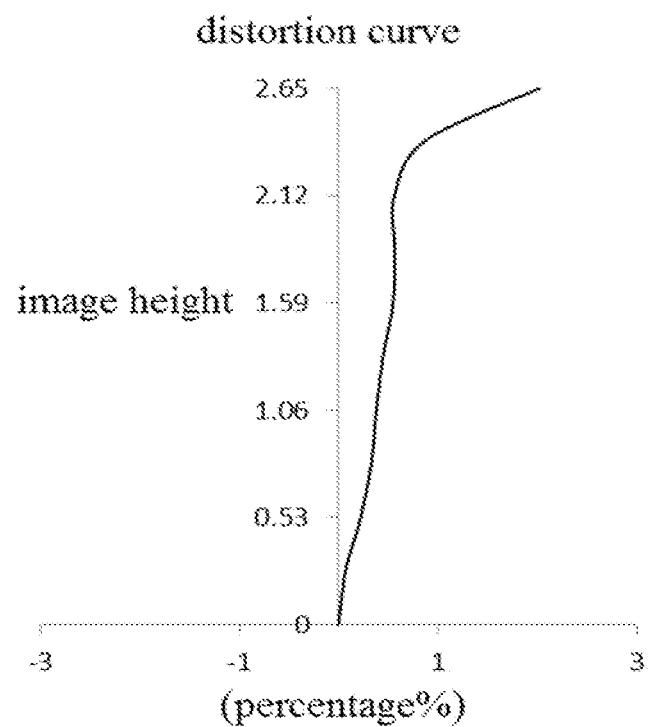

FIG. 7A and FIG. 8A show longitudinal aberration curves of the imaging lens assembly of which the movable diaphragm is at the minimum distance and the maximum distance from the imaging surface of the imaging lens assembly on the optical axis according to embodiment 2 respectively, to represent deviation of a convergence focal point after light with different wavelengths passes through the lens. FIG. 7B and FIG. 8B show astigmatism curves of the imaging lens assembly of which the movable diaphragm is at the minimum distance and the maximum distance from the imaging surface of the imaging lens assembly on the optical axis according to embodiment 2 respectively to represent a tangential image surface curvature and a sagittal image surface curvature. FIG. 7C and FIG. 8C show distortion curves of the imaging lens assembly of which the movable diaphragm is at the minimum distance and the maximum distance from the imaging surface of the imaging lens assembly on the optical axis according to embodiment 2 respectively to represent distortion values corresponding to different image heights. According to FIG. 7A to FIG. 8C, it can be seen that the imaging lens assembly provided in embodiment 2 achieves high imaging quality.

Embodiment 3

Figure 9:
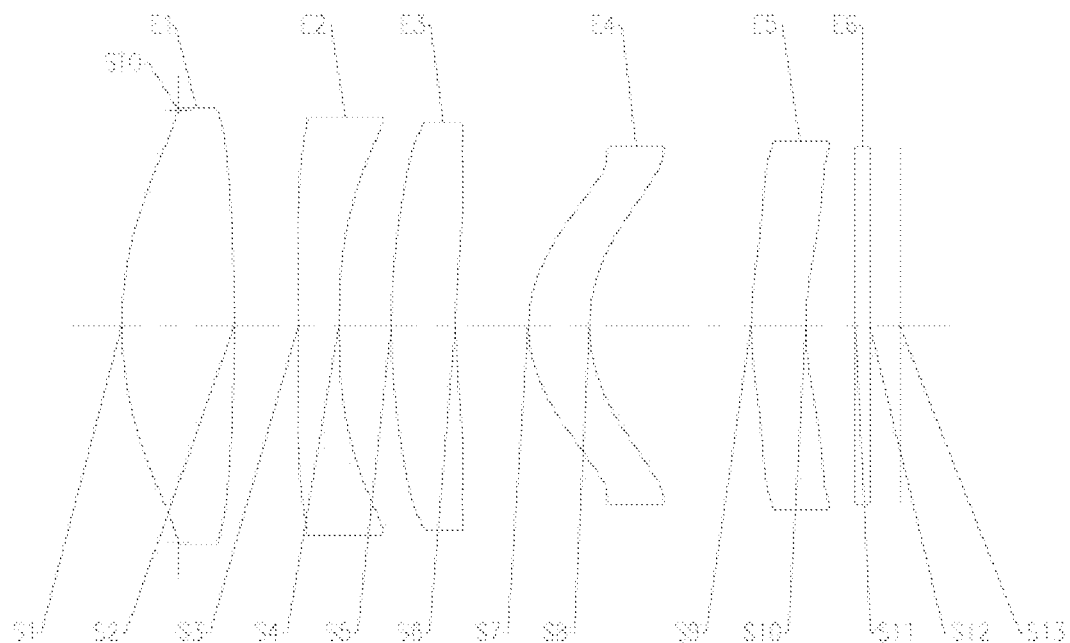
FIG. 9 illustrates a structure diagram of an imaging lens according to embodiment 3 of the disclosure, a movable diaphragm being at a minimum distance from an imaging surface of the imaging lens assembly.
Figure 10:
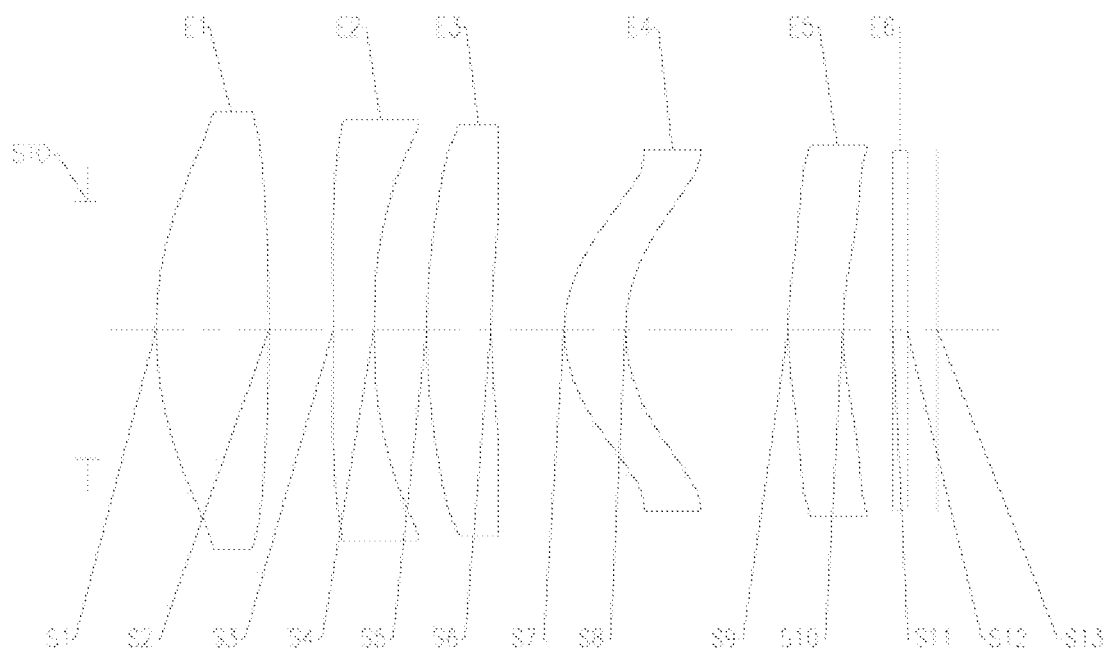
FIG. 10 illustrates a structure diagram of an imaging lens according to embodiment 3 of the disclosure, a movable diaphragm being at a maximum distance from an imaging surface of the imaging lens assembly.

An imaging lens assembly according to embodiment 3 of the disclosure will be described below with reference to FIG. 9 to FIG. 12C. FIG. 9 and FIG. 10 are structure diagrams of an imaging lens assembly of which a movable diaphragm is at a minimum distance and a maximum distance from an imaging surface of the imaging lens assembly according to embodiment 3 of the disclosure respectively.

As shown in FIG. 9 and FIG. 10, the imaging lens assembly sequentially includes, from an object side to an image side, a movable diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a convex surface. The second lens E2 has a negative refractive power, an object-side surface S3 thereof is a concave surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially passes through each of the surfaces S1 to S12 and is finally imaged on the imaging surface S13.

In the example, a total effective focal length f of the imaging lens assembly is 9.08 mm, TSmin, a distance from the movable diaphragm at the minimum distance from the imaging surface of the imaging lens assembly to the object-side surface of the first lens on an optical axis, is −0.8301 mm; TSmax, a distance from the movable diaphragm at the maximum distance from the imaging surface of the imaging lens assembly to the object-side surface of the first lens on the optical axis, is 1.0000 mm; FNOmin, an f-number of the imaging lens assembly when the distance from the movable diaphragm to the imaging surface of the imaging lens assembly on the optical axis is minimum, is 1.43; FNOmax, an f-number of the imaging lens assembly when the distance from the movable diaphragm to the imaging surface of the imaging lens assembly on the optical axis is maximum, is 2.41, and a maximum FOV of the imaging lens assembly is 32.0°.

Table 5 is a basic parameter table of the imaging lens assembly of embodiment 3, and units of the radius of curvature, the thickness/distance and the focal length are all mm. Table 6 shows high-order coefficients applied to each aspherical mirror surface in embodiment 3. A surface type of each aspherical surface is defined by the formula (1) given in embodiment 1.

TABLE 5

| Surface number | Surface type | Radius of curvature | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspherical | 5.1975 | 1.6500 | 1.546 | 56.14 | 8.31 | 0.3630 |
| S2 | Aspherical | −20.9144 | 0.9354 | | | | 0.0000 |
| S3 | Aspherical | −26.2194 | 0.5924 | 1.645 | 23.53 | −13.63 | 67.1149 |
| S4 | Aspherical | 7.0964 | 0.7692 | | | | 0.0000 |
| S5 | Aspherical | 11.7841 | 0.9370 | 1.546 | 56.14 | −28.50 | 0.4042 |
| S6 | Aspherical | 6.5170 | 1.0677 | | | | 2.5046 |
| S7 | Aspherical | 1.9018 | 0.8962 | 1.546 | 56.14 | 10.49 | −1.2624 |
| S8 | Aspherical | 2.3739 | 2.3711 | | | | −0.4467 |
| S9 | Aspherical | 5.0795 | 0.7989 | 1.667 | 20.37 | −50.10 | −2.8592 |
| S10 | Aspherical | 10.3479 | 0.7280 | | | | 0.0000 |
| S11 | Spherical | Infinite | 0.2100 | 1.518 | 64.17 | | |
| S12 | Spherical | Infinite | 0.4408 | | | | |
| S13 | Spherical | Infinite | | | | | |

TABLE 6

| Surface number | A4 | A6 | A8 | A10 | A12 |
|---|---|---|---|---|---|
| S1 | −2.6714E−01 | −3.8868E−02 | −7.9575E−03 | −1.3020E−03 | −3.0298E−04 |
| S2 | 2.3056E−01 | −7.1813E−02 | 1.6878E−02 | −1.7334E−03 | 2.6998E−06 |
| S3 | 4.9052E−01 | −2.4159E−02 | 1.6483E−02 | −3.7000E−03 | 3.6869E−04 |
| S4 | −4.4894E−04 | −7.8864E−02 | 3.7021E−02 | −4.6259E−02 | 1.1988E−02 |
| S5 | 5.6218E−02 | 1.0803E−02 | 2.1139E−02 | −1.0964E−03 | −1.3183E−03 |
| S6 | −8.3813E−01 | 9.1345E−02 | −7.4025E−03 | 6.3538E−03 | −1.4110E−03 |
| S7 | −3.4593E−01 | −8.7038E−02 | −2.5020E−02 | −3.1394E−04 | −1.6701E−03 |
| S8 | −4.7287E−01 | −1.2121E−01 | −9.9531E−03 | 1.7833E−03 | −1.2523E−03 |
| S9 | −2.8201E−01 | 5.8377E−02 | 9.9824E−03 | −1.4678E−03 | −4.8134E−04 |
| S10 | 1.7144E−01 | 6.8215E−02 | 1.3749E−01 | −1.3821E−01 | 9.2988E−02 |

| Surface number | A14 | A16 | A18 | A20 |
|---|---|---|---|---|
| S1 | −7.7995E−05 | −6.1708E−06 | −1.2252E−05 | −3.4475E−06 |
| S2 | 1.1203E−03 | −5.0902E−04 | 3.6129E−04 | −1.9215E−04 |
| S3 | 1.4504E−04 | −2.0140E−04 | 1.6186E−04 | 9.0295E−05 |
| S4 | −5.6935E−03 | 2.1631E−03 | 7.5806E−04 | −4.1042E−04 |
| S5 | 2.4729E−04 | −5.7578E−04 | −1.3686E−04 | −3.0465E−05 |
| S6 | 8.8638E−04 | −4.7860E−04 | −3.3652E−05 | −4.7637E−05 |
| S7 | −8.6092E−04 | −2.3249E−04 | −3.9750E−05 | 4.8496E−06 |
| S8 | −4.1160E−04 | 2.2542E−04 | 7.5042E−05 | 2.5245E−06 |
| S9 | −3.1943E−04 | −7.0489E−05 | 2.5715E−05 | −2.2469E−05 |
| S10 | −5.1120E−02 | 2.1583E−02 | −7.3427E−03 | 1.3774E−03 |

Figure 11A:
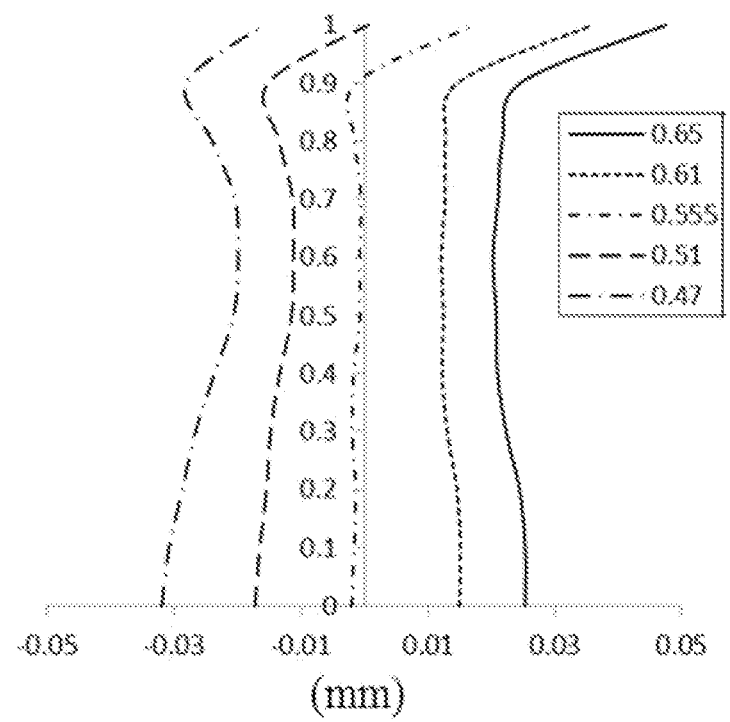
Figure 11C:
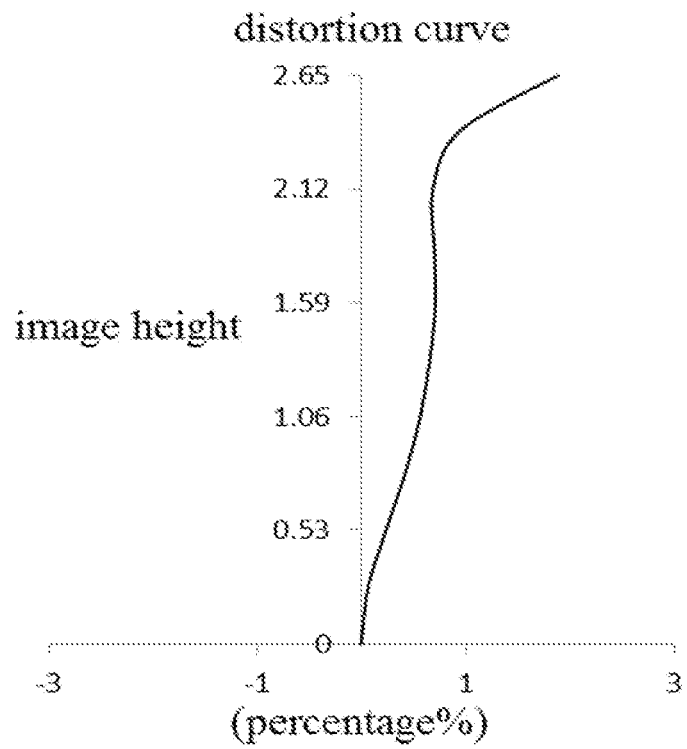
Figure 12A:
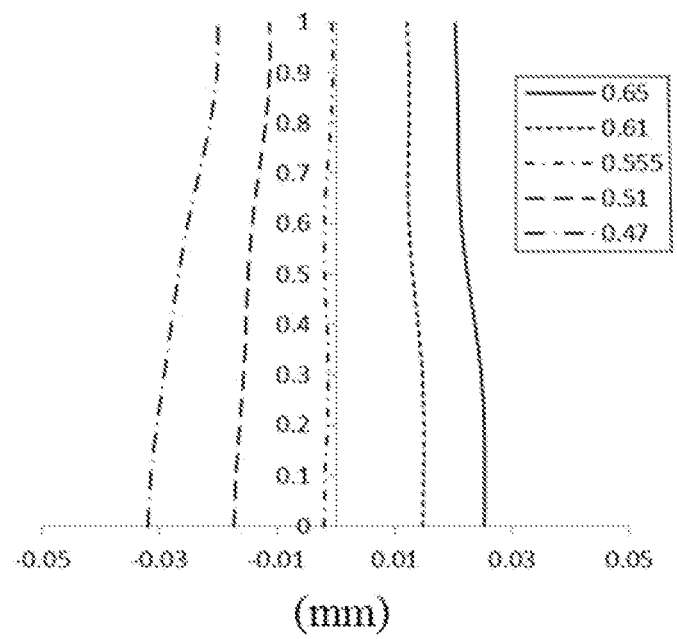
Figure 12C:
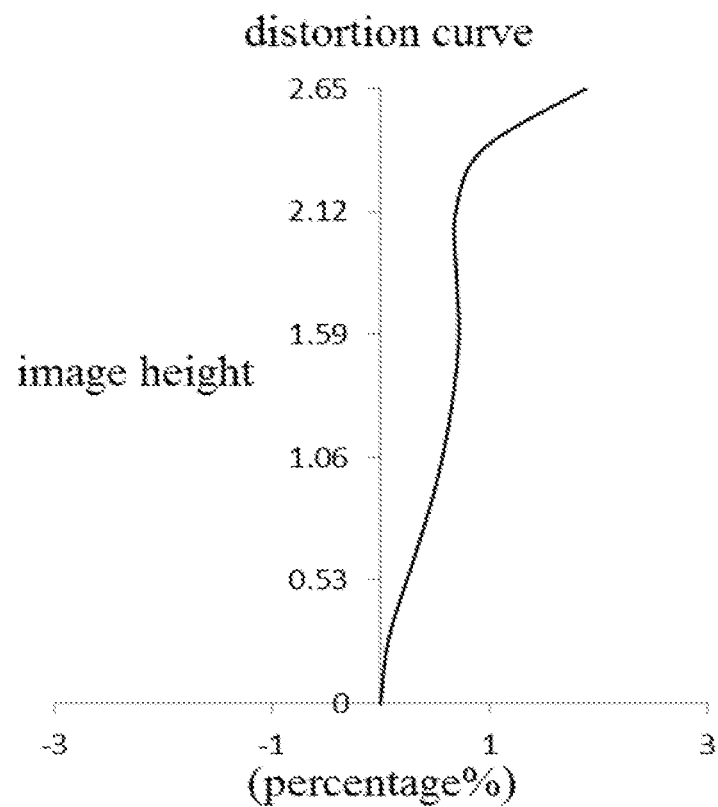

FIG. 11A and FIG. 12A show longitudinal aberration curves of the imaging lens assembly of which the movable diaphragm is at the minimum distance and the maximum distance from the imaging surface of the imaging lens assembly on the optical axis according to embodiment 3 respectively to represent deviation of a convergence focal point after light with different wavelengths passes through the lens. FIG. 11B and FIG. 12B show astigmatism curves of the imaging lens assembly of which the movable diaphragm is at the minimum distance and the maximum distance from the imaging surface of the imaging lens assembly on the optical axis according to embodiment 3 respectively to represent a tangential image surface curvature and a sagittal image surface curvature. FIG. 11C and FIG. 12C show distortion curves of the imaging lens assembly of which the movable diaphragm is at the minimum distance and the maximum distance from the imaging surface of the imaging lens assembly on the optical axis according to embodiment 3 respectively to represent distortion values corresponding to different image heights.

According to FIG. 11A to FIG. 12C, it can be seen that the imaging lens assembly provided in embodiment 3 achieves high imaging quality.

Embodiment 4

Figure 13:
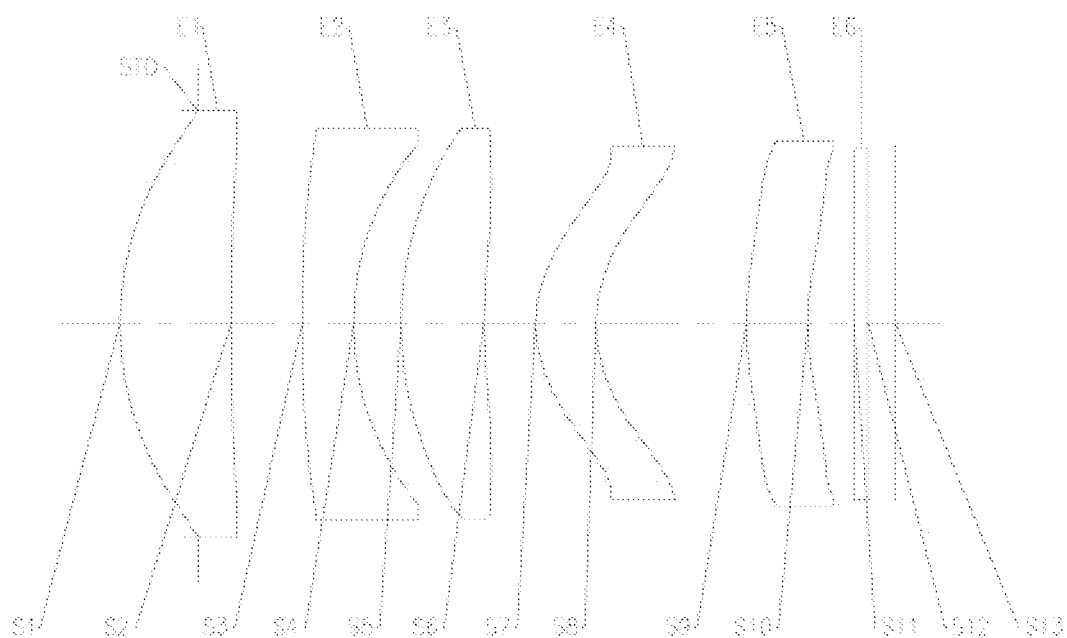
FIG. 13 illustrates a structure diagram of an imaging lens according to embodiment 4 of the disclosure, a movable diaphragm being at a minimum distance from an imaging surface of the imaging lens assembly.
Figure 14:
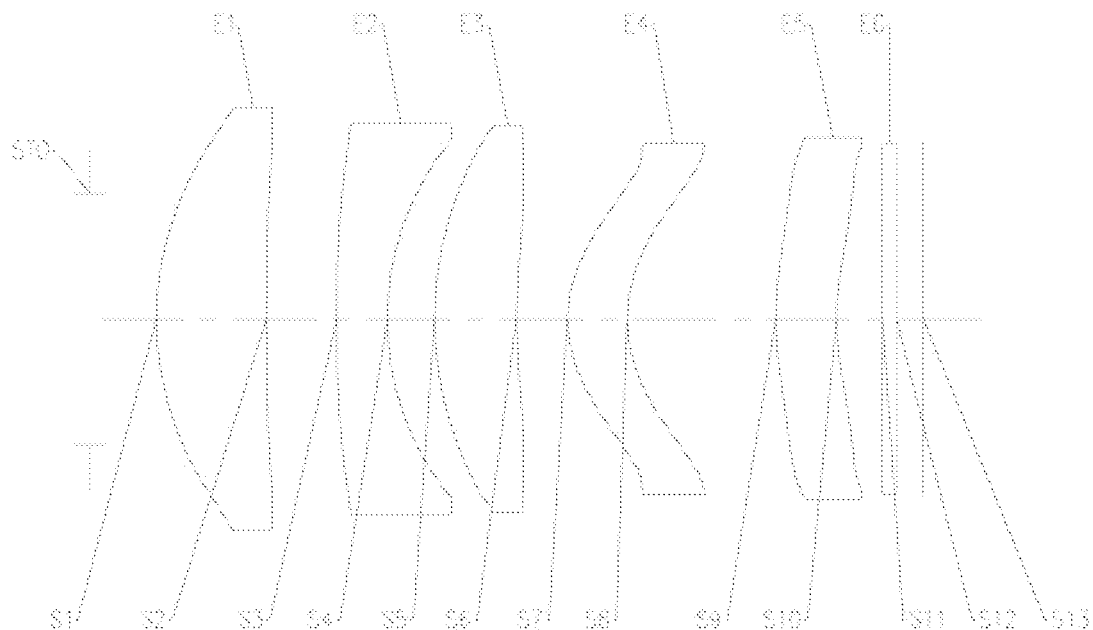
FIG. 14 illustrates a structure diagram of an imaging lens according to embodiment 4 of the disclosure, a movable diaphragm being at a maximum distance from an imaging surface of the imaging lens assembly.

An imaging lens assembly according to embodiment 4 of the disclosure will be described below with reference to FIG. 13 to FIG. 16C. FIG. 13 and FIG. 14 are structure diagrams of an imaging lens assembly of which a movable diaphragm is at a minimum distance and a maximum distance from an imaging surface of the imaging lens assembly according to embodiment 4 of the disclosure respectively. As shown in FIG. 13 and FIG. 14, the imaging lens assembly sequentially includes, from an object side to an image side, a movable diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially passes through each of the surfaces S1 to S12 and is finally imaged on the imaging surface S13.

In the example, a total effective focal length f of the imaging lens assembly is 9.08 mm, a distance TSmin from the movable diaphragm at the minimum distance from the imaging surface of the imaging lens assembly to the object-side surface of the first lens on an optical axis is −1.1602 mm, a distance TSmax from the movable diaphragm at the maximum distance from the imaging surface of the imaging lens assembly to the object-side surface of the first lens on the optical axis is 1.0000 mm, an f-number FNOmin of the imaging lens assembly when the distance from the movable diaphragm to the imaging surface of the imaging lens assembly on the optical axis is minimum is 1.43, an f-number FNOmax of the imaging lens assembly, when the distance from the movable diaphragm to the imaging surface of the imaging lens assembly on the optical axis, is maximum is 2.41, and a maximum FOV of the imaging lens assembly is 32.3°.

Table 7 is a basic parameter table of the imaging lens assembly of embodiment 4, and units of the radius of curvature, the thickness/distance and the focal length are all mm. Table 8 shows high-order coefficients applied to each aspherical mirror surface in embodiment 4. A surface type of each aspherical surface is defined by the formula (1) given in embodiment 1.

TABLE 7

| Surface number | Surface type | Radius of curvature | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspherical | 4.6254 | 1.6500 | 1.546 | 56.14 | 8.67 | 0.4652 |
| S2 | Aspherical | 58.9638 | 1.0563 | | | | 0.0000 |
| S3 | Aspherical | 506.4161 | 0.7605 | 1.645 | 23.53 | −8.12 | −99.0000 |
| S4 | Aspherical | 4.2494 | 0.7045 | | | | 0.0000 |
| S5 | Aspherical | 5.4071 | 1.2252 | 1.546 | 56.14 | 42.22 | 0.0000 |
| S6 | Aspherical | 6.4992 | 0.7649 | | | | 2.2355 |
| S7 | Aspherical | 1.8671 | 0.8974 | 1.546 | 56.14 | 11.19 | −1.3072 |
| S8 | Aspherical | 2.2329 | 2.2288 | | | | −0.5138 |
| S9 | Aspherical | 5.0118 | 0.9112 | 1.667 | 20.37 | −56.32 | −5.8879 |
| S10 | Aspherical | 8.4493 | 0.6892 | | | | 0.0000 |
| S11 | Spherical | Infinite | 0.2100 | 1.518 | 64.17 | | |
| S12 | Spherical | Infinite | 0.4020 | | | | |
| S13 | Spherical | Infinite | | | | | |

TABLE 8

| Surface number | A4 | A6 | A8 | A10 | A12 |
|---|---|---|---|---|---|
| S1 | −2.0653E−01 | −4.6637E−02 | −1.2098E−02 | −3.1159E−03 | −7.6680E−04 |
| S2 | 1.8295E−01 | −9.2423E−02 | 1.3483E−02 | −2.7640E−03 | −1.4806E−03 |
| S3 | 3.4266E−01 | −9.0123E−02 | 2.5689E−02 | −1.5730E−02 | 1.0561E−03 |
| S4 | 4.2318E−02 | −5.0426E−02 | 4.3690E−02 | −5.3803E−02 | 1.9359E−02 |
| S5 | 4.2318E−02 | −5.0426E−02 | 4.3690E−02 | −5.3803E−02 | 1.9359E−02 |
| S6 | −8.4712E−01 | 8.7246E−02 | −1.9088E−02 | 6.1241E−03 | −2.6065E−03 |
| S7 | −3.7250E−01 | −7.7621E−02 | −2.6801E−02 | 1.1669E−04 | −2.7300E−03 |
| S8 | −4.7908E−01 | −1.1111E−01 | −9.2964E−03 | 1.8329E−03 | −1.1757E−03 |
| S9 | −2.2683E−01 | 6.0745E−02 | 7.1225E−03 | −8.1985E−04 | −4.4923E−04 |
| S10 | −7.8600E−02 | 1.4073E−01 | 1.5020E−01 | −1.6722E−01 | 1.1531E−01 |

| Surface number | A14 | A16 | A18 | A20 |
|---|---|---|---|---|
| S1 | −1.4858E−04 | −3.7967E−05 | −1.2715E−05 | 2.3214E−06 |
| S2 | 7.5095E−04 | −4.7026E−04 | 3.6298E−04 | −1.0445E−04 |
| S3 | −1.0493E−03 | 1.0257E−03 | 3.8278E−04 | 9.2138E−06 |
| S4 | −1.2015E−02 | 3.5401E−03 | −6.8845E−04 | 3.2996E−04 |
| S5 | −1.2015E−02 | 3.5401E−03 | −6.8845E−04 | 3.2996E−04 |
| S6 | 1.2143E−03 | −3.5732E−04 | 1.2932E−04 | −6.8306E−05 |
| S7 | −7.5547E−04 | −2.7593E−04 | −4.1303E−05 | −1.7923E−05 |
| S8 | −1.2941E−04 | 1.6976E−04 | 1.5884E−05 | −1.3201E−05 |
| S9 | −1.9682E−04 | 3.6947E−06 | 2.0431E−05 | −1.3150E−05 |
| S10 | −6.0273E−02 | 2.4648E−02 | −7.8057E−03 | 1.4396E−03 |

Figure 15A:
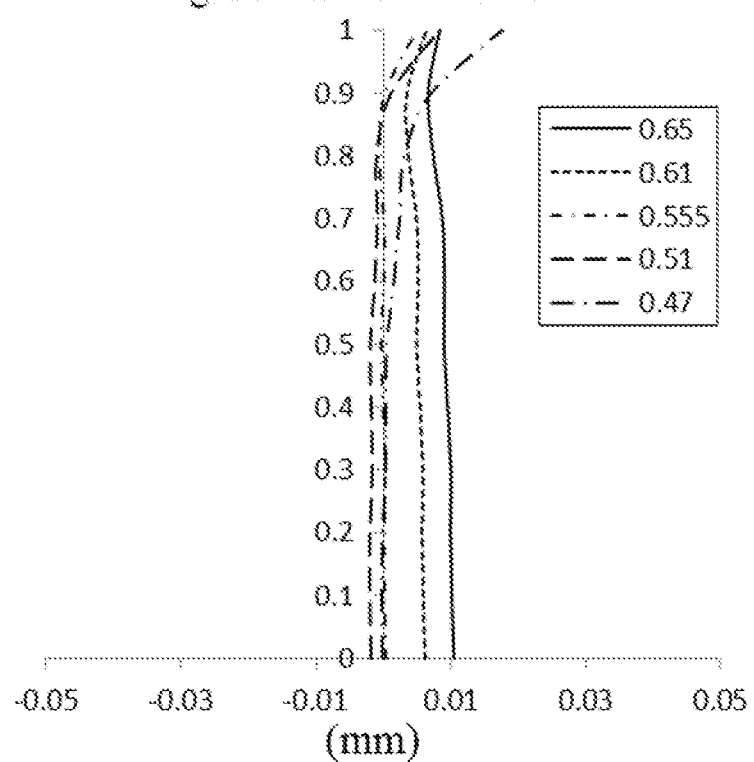
FIG. 15A to FIG. 15C illustrate a longitudinal aberration curve, astigmatism curve and distortion curve of an imaging lens assembly of which a movable diaphragm is at a minimum distance from an imaging surface of the imaging lens assembly on an optical axis according to embodiment 4 respectively.
Figure 15B:
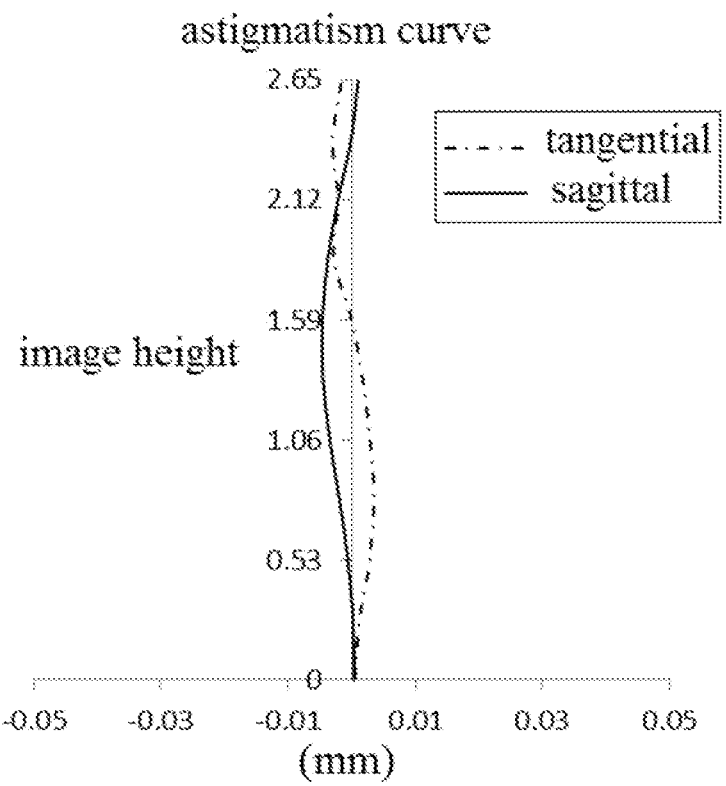
Figure 15C:
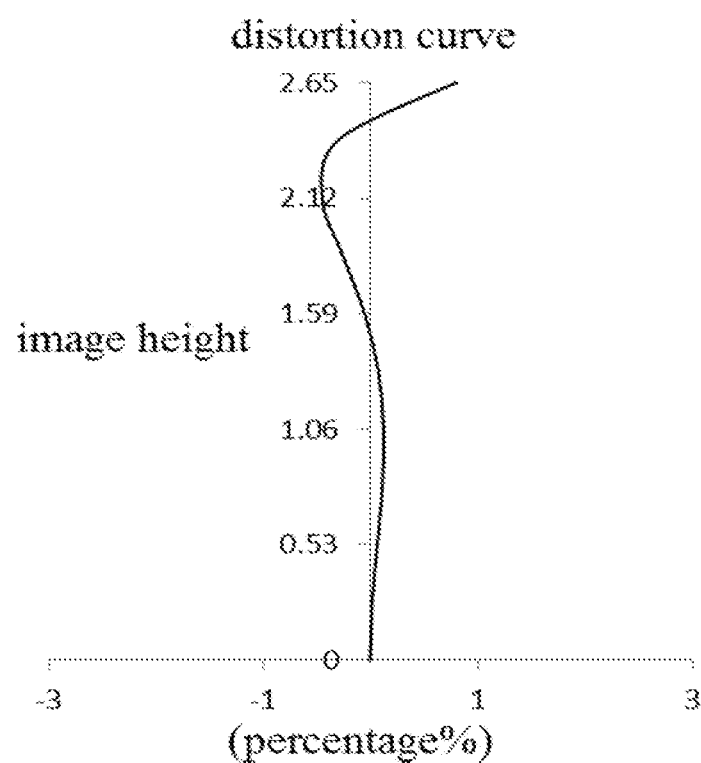
Figure 16A:
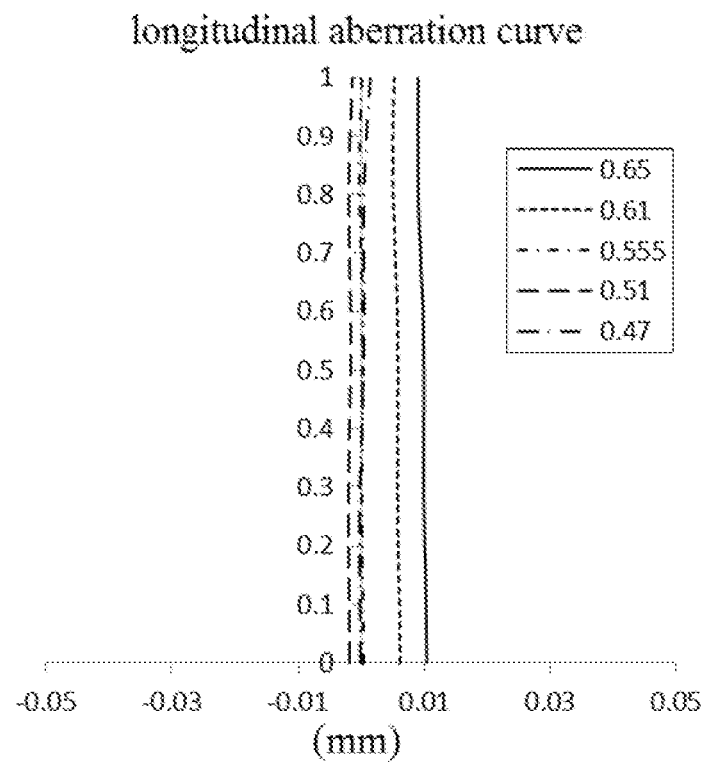
FIG. 16A to FIG. 16C illustrate a longitudinal aberration curve, astigmatism curve and distortion curve of an imaging lens assembly of which a movable diaphragm is at a maximum distance from an imaging surface of the imaging lens assembly on an optical axis according to embodiment 4 respectively.
Figure 16B:
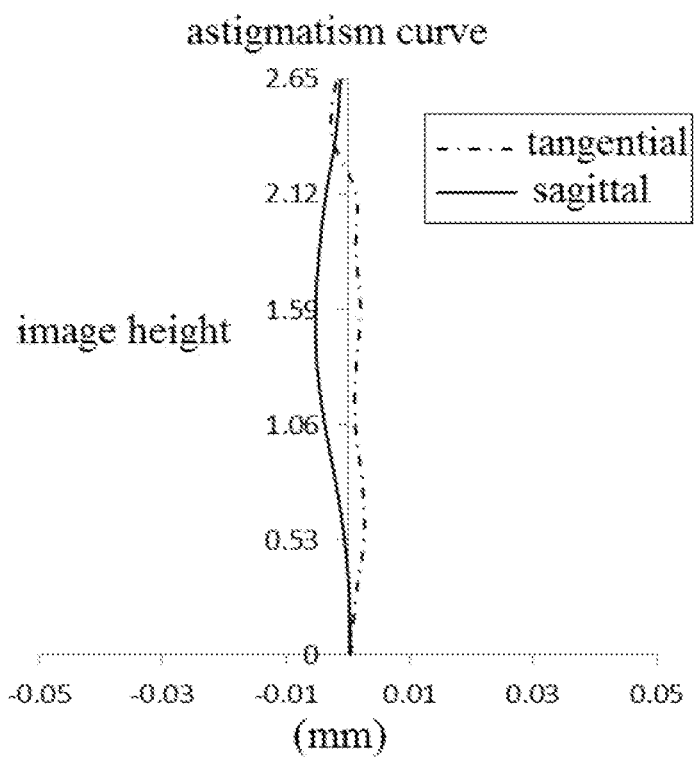
Figure 16C:
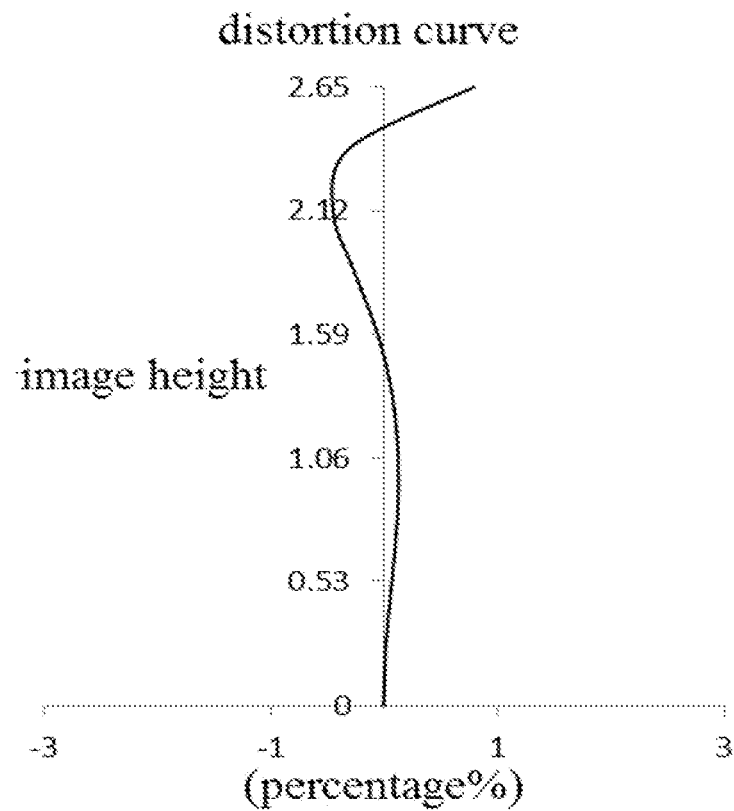

FIG. 15A and FIG. 16A show longitudinal aberration curves of the imaging lens assembly of which the movable diaphragm is at the minimum distance and the maximum distance from the imaging surface of the imaging lens assembly on the optical axis according to embodiment 4 respectively to represent deviation of a convergence focal point after light with different wavelengths passes through the lens. FIG. 15B and FIG. 16B show astigmatism curves of the imaging lens assembly of which the movable diaphragm is at the minimum distance and the maximum distance from the imaging surface of the imaging lens assembly on the optical axis according to embodiment 4 respectively to represent a tangential image surface curvature and a sagittal image surface curvature. FIG. 15C and FIG. 16C show distortion curves of the imaging lens assembly of which the movable diaphragm is at the minimum distance and the maximum distance from the imaging surface of the imaging lens assembly on the optical axis according to embodiment 4 respectively to represent distortion values corresponding to different image heights. According to FIG. 15A to FIG. 16C, it can be seen that the imaging lens assembly provided in embodiment 4 achieves high imaging quality.

Embodiment 5

Figure 17:
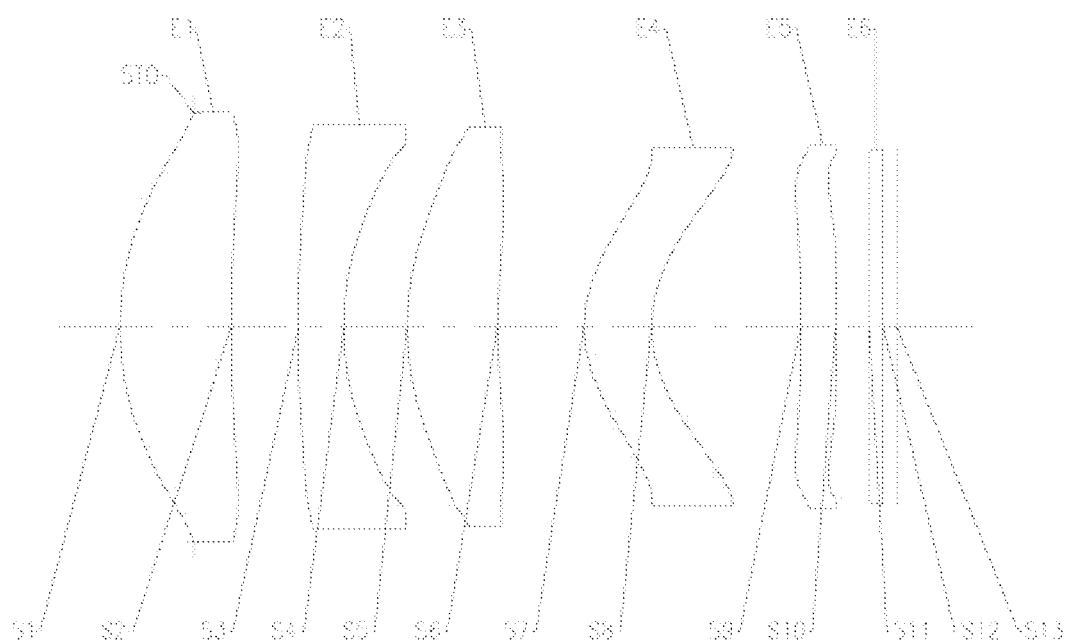
FIG. 17 illustrates a structure diagram of an imaging lens assembly according to embodiment 5 of the disclosure, a movable diaphragm being at a minimum distance from an imaging surface of the imaging lens assembly.
Figure 18:
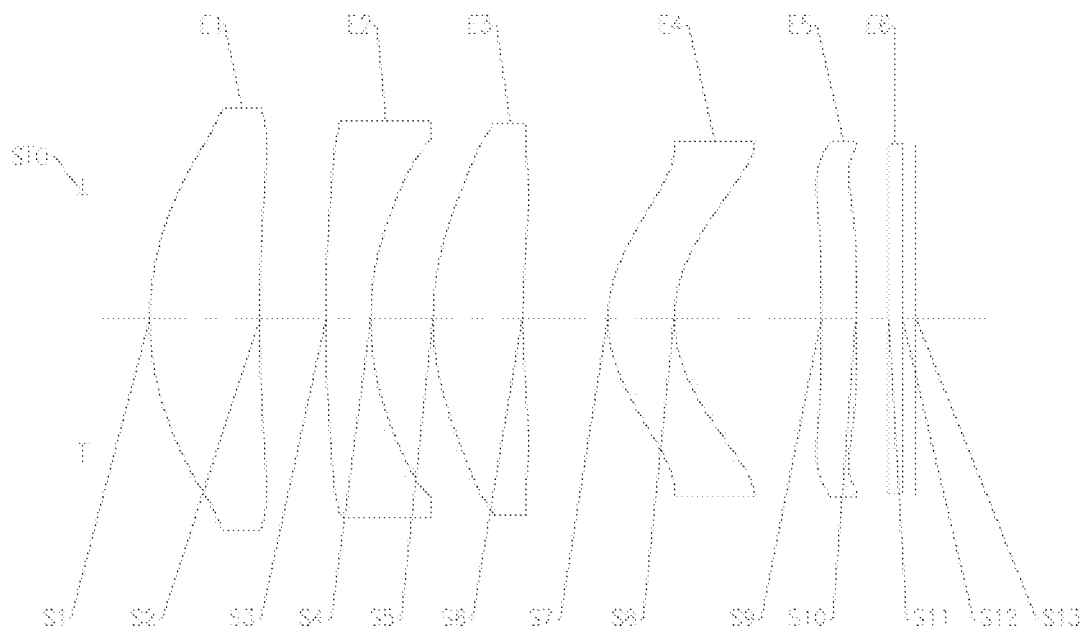
FIG. 18 illustrates a structure diagram of an imaging lens assembly according to embodiment 5 of the disclosure, a movable diaphragm being at a maximum distance from an imaging surface of the imaging lens assembly.

An imaging lens assembly according to embodiment 5 of the disclosure will be described below with reference to FIG. 17 to FIG. 20C. FIG. 17 and FIG. 18 are structure diagrams of an imaging lens assembly of which a movable diaphragm is at a minimum distance and a maximum distance from an imaging surface of the imaging lens assembly according to embodiment 5 of the disclosure respectively. As shown in FIG. 17 and FIG. 18, the imaging lens assembly sequentially includes, from an object side to an image side, a movable diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a concave surface. The second lens E2 has a negative refractive power, an object-side surface S3 thereof is a concave surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a convex surface. The optical filter E6 has an object-side surface S11 and an image-side surface S12. Light from an object sequentially passes through each of the surfaces S1 to S12 and is finally imaged on the imaging surface S13.

In the example, a total effective focal length f of the imaging lens assembly is 9.08 mm, TSmin, a distance from the movable diaphragm at the minimum distance from the imaging surface of the imaging lens assembly to the object-side surface of the first lens on an optical axis, is −1.0974 mm, TSmax, a distance from the movable diaphragm at the maximum distance from the imaging surface of the imaging lens assembly to the object-side surface of the first lens on the optical axis, is 1.0000 mm; FNOmin, an f-number of the imaging lens assembly when the distance from the movable diaphragm to the imaging surface of the imaging lens assembly on the optical axis is minimum, is 1.43; FNOmax, an f-number of the imaging lens assembly when the distance from the movable diaphragm to the imaging surface of the imaging lens assembly on the optical axis is maximum, is 2.41, and a maximum FOV of the imaging lens assembly is 32.2°.

Table 9 is a basic parameter table of the imaging lens assembly of embodiment 5, and units of the radius of curvature, the thickness/distance and the focal length are all mm. Table 10 shows high-order coefficients applied to each aspherical mirror surface in embodiment 5. A surface type of each aspherical surface is defined by the formula (1) given in embodiment 1.

TABLE 9

| Surface number | Surface type | Radius of curvature | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspherical | 4.4679 | 1.6500 | 1.546 | 56.14 | 8.91 | 0.3133 |
| S2 | Aspherical | 69.5343 | 0.9957 | | | | 0.0000 |
| S3 | Aspherical | −47.3631 | 0.6706 | 1.645 | 23.53 | −8.08 | 99.0000 |
| S4 | Aspherical | 5.8855 | 0.9331 | | | | −6.5821 |
| S5 | Aspherical | 4.2391 | 1.3400 | 1.546 | 56.14 | 16.38 | −1.6190 |
| S6 | Aspherical | 57.3709 | 1.2806 | | | | 0.0000 |
| S7 | Aspherical | 1.9130 | 0.9987 | 1.546 | 56.14 | 15.72 | −1.5812 |
| S8 | Aspherical | 3.5777 | 2.2110 | | | | 0.0000 |
| S9 | Aspherical | −47.8963 | 0.5168 | 1.667 | 20.37 | −79.44 | −23.7993 |
| S10 | Aspherical | −500.0000 | 0.4903 | | | | 99.0000 |
| S11 | Spherical | Infinite | 0.2100 | 1.518 | 64.17 | | |
| S12 | Spherical | Infinite | 0.2031 | | | | |
| S13 | Spherical | Infinite | | | | | |

TABLE 10

| Surface number | A4 | A6 | A8 | A10 | A12 |
|---|---|---|---|---|---|
| S1 | −2.3249E−01 | −6.8212E−02 | −1.6362E−02 | −4.2578E−03 | −9.7790E−04 |
| S2 | 3.3121E−01 | −9.4384E−02 | 9.3518E−03 | −8.3129E−03 | −1.7662E−03 |
| S3 | 4.2897E−01 | −8.4017E−02 | 5.2027E−02 | −3.1283E−02 | 4.0719E−03 |
| S4 | 5.1302E−01 | −6.8032E−02 | 4.6710E−02 | −3.1016E−02 | −2.8186E−03 |
| S5 | −7.6248E−02 | 1.3490E−02 | 2.9344E−02 | 8.5046E−04 | −9.3664E−04 |
| S6 | −5.0720E−02 | 1.9999E−01 | 4.8916E−03 | −4.4586E−02 | 5.7948E−02 |
| S7 | −3.8136E−01 | −5.8363E−02 | −3.4909E−03 | 2.7377E−04 | −4.6300E−03 |
| S8 | 1.0110E+00 | −7.1945E−02 | 8.6316E−03 | −4.0187E−03 | −3.2511E−03 |
| S9 | 5.2432E−03 | 7.6425E−02 | 1.4182E−02 | −9.4812E−03 | 2.2239E−03 |
| S10 | −1.3391E−01 | 6.3031E−02 | 3.5254E−02 | −1.1833E−02 | 3.5938E−03 |

| Surface number | A14 | A16 | A18 | A20 |
|---|---|---|---|---|
| S1 | −1.1639E−04 | −3.8900E−05 | 7.8706E−06 | 1.3940E−06 |
| S2 | −1.6930E−04 | 8.5101E−05 | 9.4946E−05 | 6.7932E−05 |
| S3 | −5.1309E−03 | −7.5762E−04 | −4.9758E−04 | −5.7078E−05 |
| S4 | −6.3182E−03 | −2.2427E−03 | −8.3156E−04 | −2.7219E−04 |
| S5 | −1.4225E−03 | −8.6702E−04 | −2.8885E−04 | −6.3434E−05 |
| S6 | −3.3844E−02 | 1.6826E−02 | −5.0710E−03 | 1.0329E−03 |
| S7 | −3.1001E−04 | −2.5937E−04 | −7.8703E−05 | 1.0465E−06 |
| S8 | 1.7151E−03 | −1.3059E−03 | −1.9070E−04 | 9.5175E−04 |
| S9 | −9.1961E−04 | 5.1856E−04 | −8.7682E−05 | −2.1896E−05 |
| S10 | −1.9630E−03 | 6.8162E−04 | −8.4985E−05 | 4.9484E−05 |

Figure 19A:
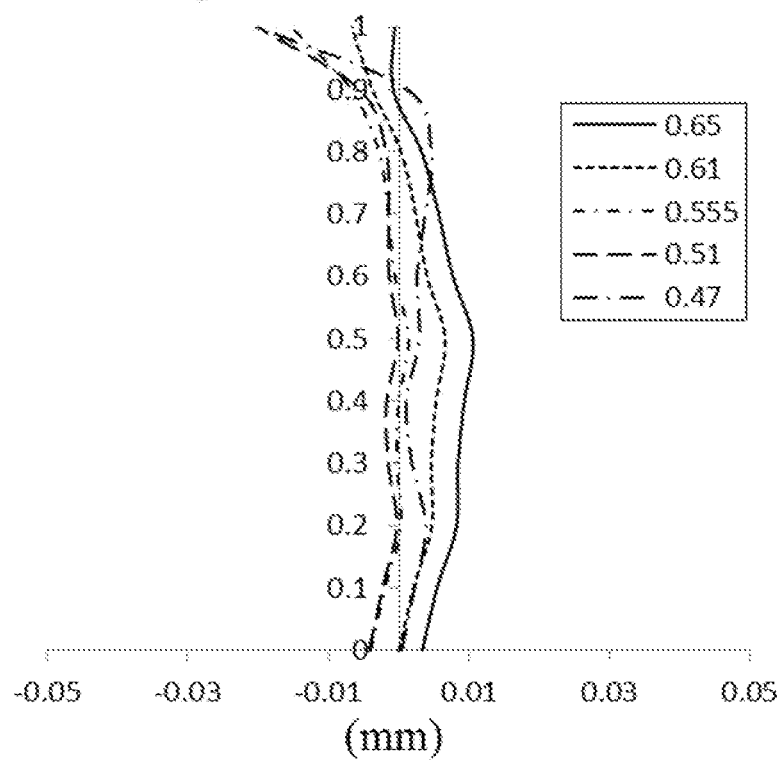
FIG. 19A to FIG. 19C illustrate a longitudinal aberration curve, astigmatism curve and distortion curve of an imaging lens assembly of which a movable diaphragm is at a minimum distance from an imaging surface of the imaging lens assembly on an optical axis according to embodiment 5 respectively.
Figure 19B:
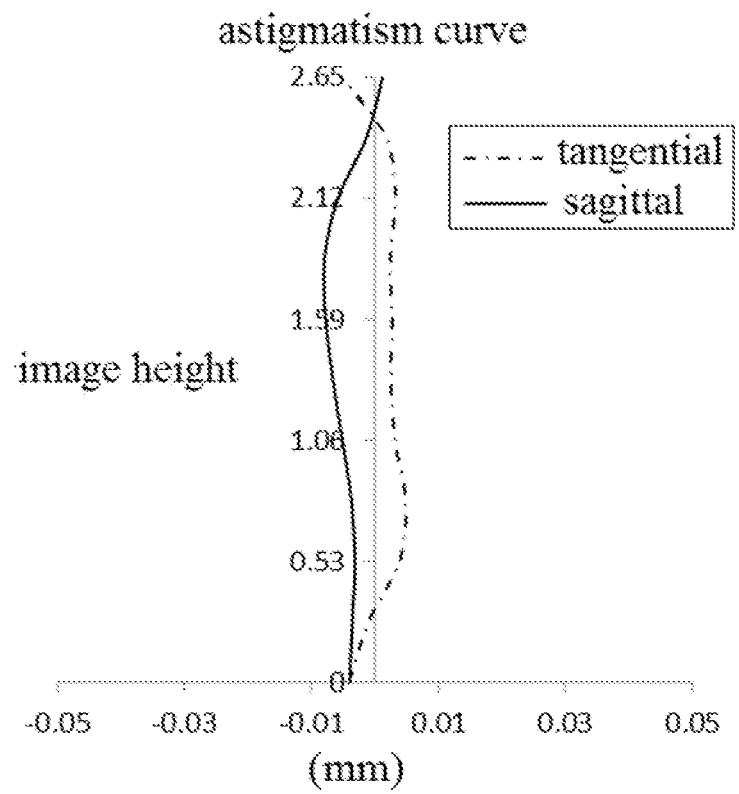
Figure 19C:
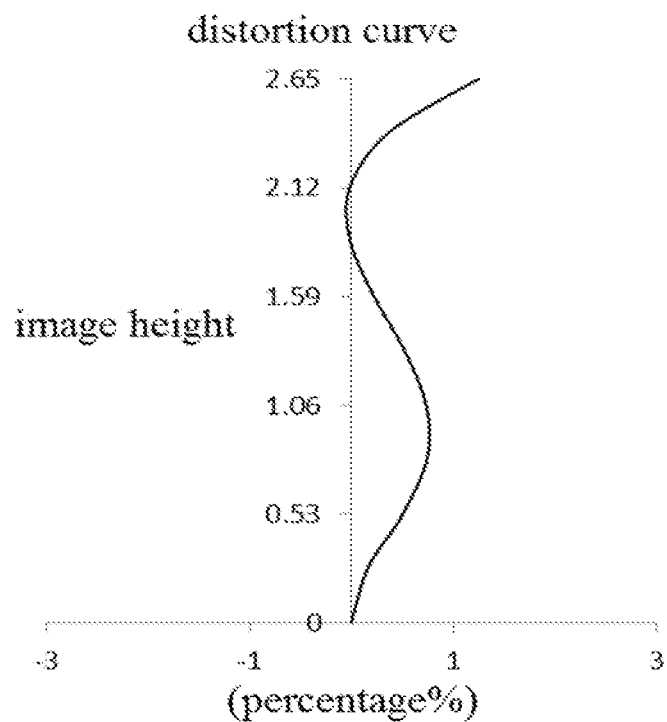
Figure 20B:
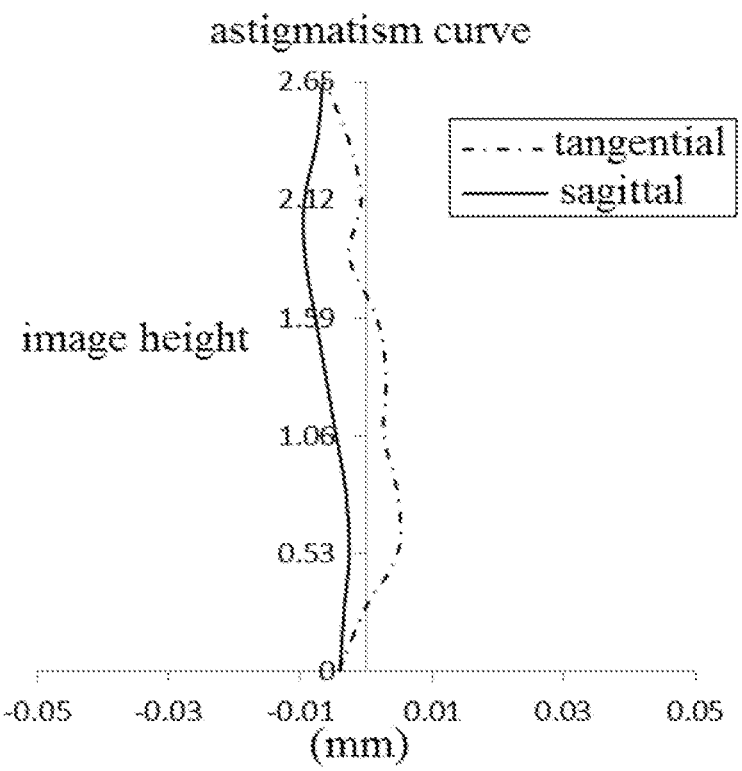
Figure 20C:
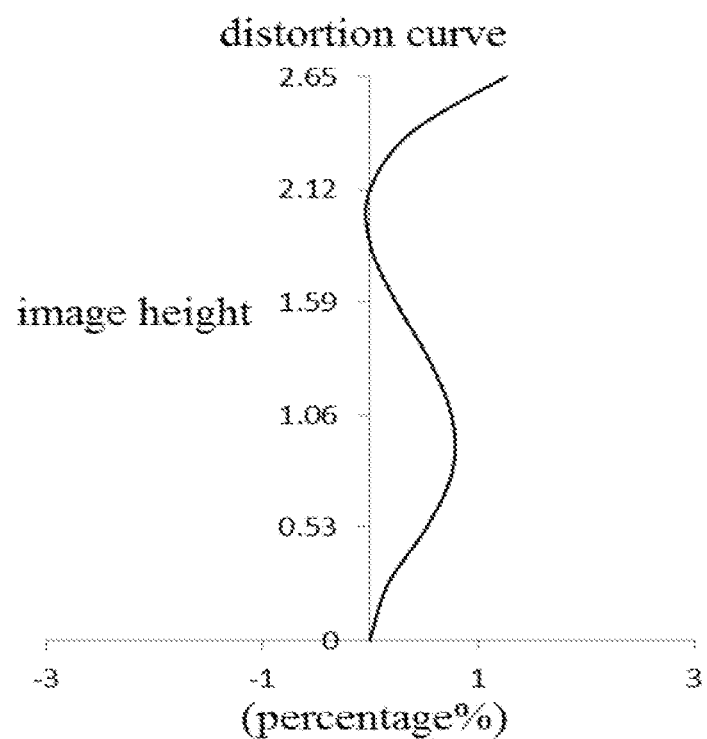

FIG. 19A and FIG. 20A show longitudinal aberration curves of the imaging lens assembly of which the movable diaphragm is at the minimum distance and the maximum distance from the imaging surface of the imaging lens assembly on the optical axis according to embodiment 5 respectively to represent deviation of a convergence focal point after light with different wavelengths passes through the lens. FIG. 19B and FIG. 20B show astigmatism curves of the imaging lens assembly of which the movable diaphragm is at the minimum distance and the maximum distance from the imaging surface of the imaging lens assembly on the optical axis according to embodiment 5 respectively to represent a tangential image surface curvature and a sagittal image surface curvature. FIG. 19C and FIG. 20C show distortion curves of the imaging lens assembly of which the movable diaphragm is at the minimum distance and the maximum distance from the imaging surface of the imaging lens assembly on the optical axis according to embodiment 5 respectively to represent distortion values corresponding to different image heights. According to FIG. 19A to FIG. 20C, it can be seen that the imaging lens assembly provided in embodiment 5 achieves high imaging quality.

Embodiment 6

Figure 21:
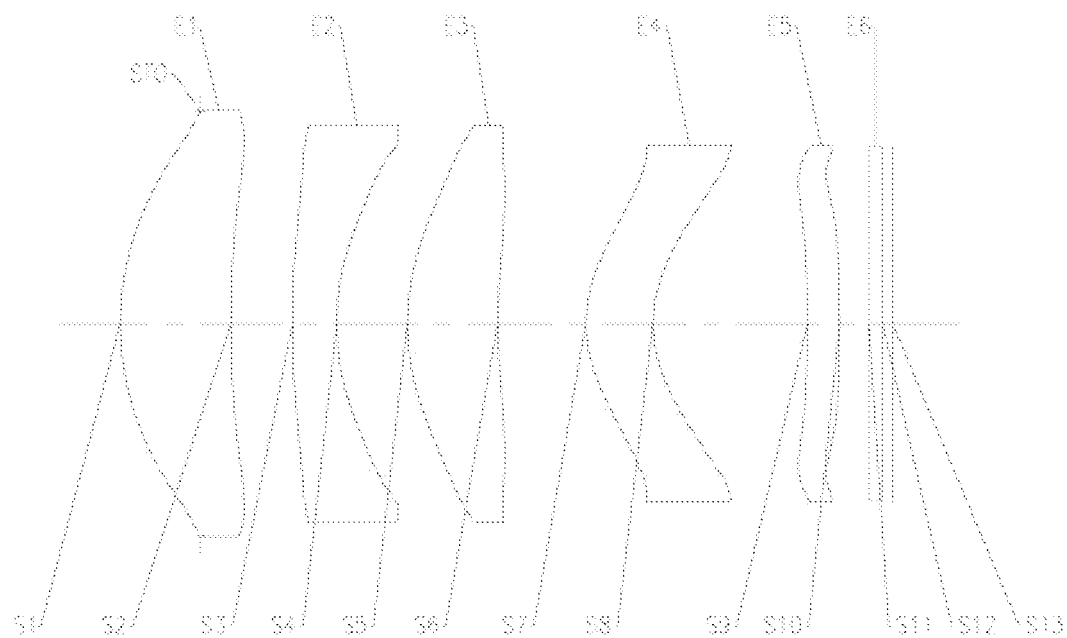
FIG. 21 illustrates a structure diagram of an imaging lens assembly according to embodiment 6 of the disclosure, movable diaphragm being at a minimum distance from an imaging surface of the imaging lens assembly.
Figure 22:
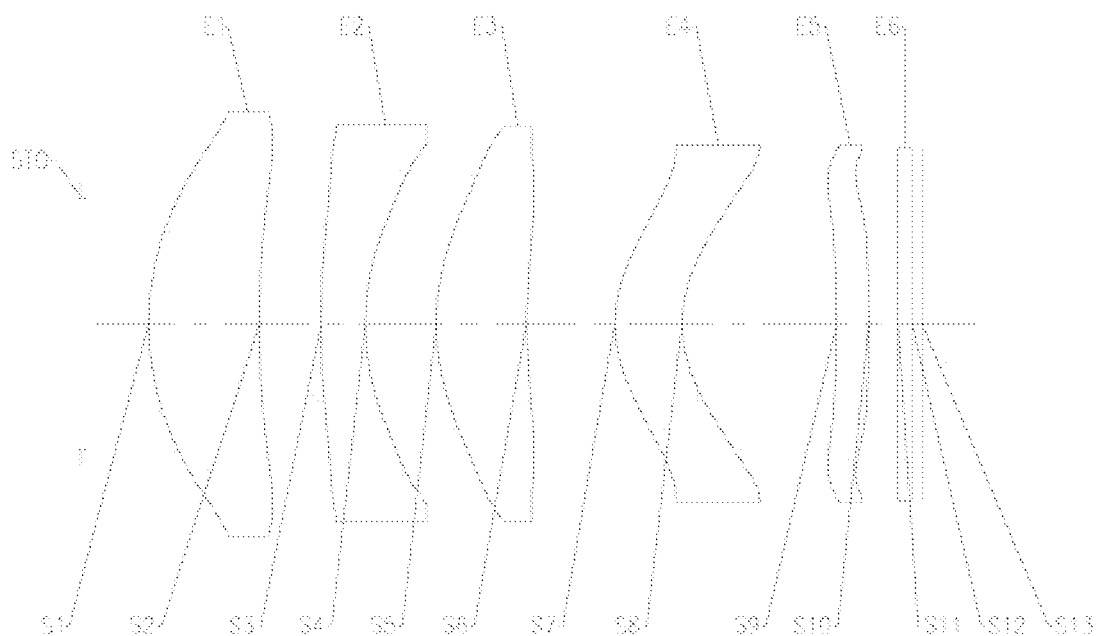
FIG. 22 illustrates a structure diagram of an imaging lens assembly according to embodiment 6 of the disclosure, a movable diaphragm being at a maximum distance from an imaging surface of the imaging lens assembly.

An imaging lens assembly according to embodiment 6 of the disclosure will be described below with reference to FIG. 21 to FIG. 24C. FIG. 21 and FIG. 22 are structure diagrams of an imaging lens assembly of which a movable diaphragm is at a minimum distance and a maximum distance from an imaging surface of the imaging lens assembly according to embodiment 6 of the disclosure respectively. As shown in FIG. 21 and FIG. 22, the imaging lens assembly sequentially includes, from an object side to an image side, a movable diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The optical filter E6 has an object-side surface S11 and an image-side surface S12. Light from an object sequentially passes through each of the surfaces S1 to S12 and is finally imaged on the imaging surface S13.

In the example, a total effective focal length f of the imaging lens assembly is 9.08 mm, TSmin, a distance from the movable diaphragm at the minimum distance from the imaging surface of the imaging lens assembly to the object-side surface of the first lens on an optical axis, is −1.1895 mm, TSmax, a distance from the movable diaphragm at the maximum distance from the imaging surface of the imaging lens assembly to the object-side surface of the first lens on the optical axis, is 1.0000 mm, FNOmin, an f-number of the imaging lens assembly when the distance from the movable diaphragm to the imaging surface of the imaging lens assembly on the optical axis is minimum, is 1.43, FNOmax, an f-number of the imaging lens assembly when the distance from the movable diaphragm to the imaging surface of the imaging lens assembly on the optical axis is maximum, is 2.42, and a maximum FOV of the imaging lens assembly is 32.0°.

Table 11 is a basic parameter table of the imaging lens assembly of embodiment 6, and units of the radius of curvature, the thickness/distance and the focal length are all mm. Table 12 shows high-order coefficients applied to each aspherical mirror surface in embodiment 6. A surface type of each aspherical surface is defined by the formula (1) given in embodiment 1.

TABLE 11

| Surface number | Surface type | Radius of curvature | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspherical | 4.3232 | 1.6495 | 1.546 | 56.14 | 9.00 | 0.3550 |
| S2 | Aspherical | 25.2120 | 0.9176 | | | | 0.0000 |
| S3 | Aspherical | 186.9467 | 0.6569 | 1.645 | 23.53 | −7.44 | −81.2176 |
| S4 | Aspherical | 4.6705 | 1.0509 | | | | −8.0091 |
| S5 | Aspherical | 3.6237 | 1.3428 | 1.546 | 56.14 | 12.37 | −1.8092 |
| S6 | Aspherical | 41.6606 | 1.3131 | | | | 0.0000 |
| S7 | Aspherical | 1.9634 | 0.9993 | 1.546 | 56.14 | 19.55 | −1.8294 |
| S8 | Aspherical | 3.7104 | 2.3025 | | | | 0.0000 |
| S9 | Aspherical | −18.6524 | 0.4779 | 1.667 | 20.37 | 2385.75 | 0.0017 |
| S10 | Aspherical | −18.6253 | 0.4332 | | | | −0.0010 |
| S11 | Spherical | Infinite | 0.2100 | 1.518 | 64.17 | | |
| S12 | Spherical | Infinite | 0.1460 | | | | |
| S13 | Spherical | Infinite | | | | | |

TABLE 12

| Surface number | A4 | A6 | A8 | A10 | A12 |
|---|---|---|---|---|---|
| S1 | −2.0162E−01 | −7.2667E−02 | −1.9431E−02 | −5.7168E−03 | −1.3507E−03 |
| S2 | 3.6140E−01 | −1.1864E−01 | 5.3117E−03 | −7.1841E−03 | −3.3099E−03 |
| S3 | 3.0443E−01 | −9.7921E−02 | 6.1262E−02 | −4.0632E−02 | 1.1908E−03 |
| S4 | 4.7642E−01 | −7.2327E−02 | 5.7333E−02 | −3.3757E−02 | −5.0978E−03 |
| S5 | −1.1194E−01 | 3.5476E−03 | 3.3491E−02 | 4.1087E−03 | −1.7353E−03 |
| S6 | −3.8020E−02 | 2.1750E−01 | −7.4831E−03 | −5.0887E−02 | 6.7060E−02 |
| S7 | −3.8580E−01 | −3.6152E−02 | 3.0200E−03 | −2.5873E−03 | −7.7836E−04 |
| S8 | 1.0180E+00 | −8.7817E−02 | 4.5615E−02 | −1.7428E−03 | −1.1456E−02 |
| S9 | 3.8285E−02 | 6.5994E−02 | 2.3921E−02 | −1.1187E−02 | 2.0048E−03 |
| S10 | −6.8292E−02 | 4.3313E−02 | 4.7862E−02 | −1.3847E−02 | 4.1026E−03 |

| Surface number | A14 | A16 | A18 | A20 |
|---|---|---|---|---|
| S1 | −1.6335E−04 | −2.9045E−05 | 2.1810E−05 | 2.1377E−06 |
| S2 | −2.7581E−04 | 1.8119E−04 | 7.8411E−06 | 1.2342E−04 |
| S3 | −7.7805E−03 | −1.2070E−03 | −6.3279E−04 | 6.5636E−06 |
| S4 | −8.7731E−03 | −3.2404E−03 | −1.2707E−03 | −3.5231E−04 |
| S5 | −2.2052E−03 | −1.0987E−03 | −3.1089E−04 | −4.9139E−05 |
| S6 | −3.8615E−02 | 1.8300E−02 | −5.3589E−03 | 1.0207E−03 |
| S7 | −1.6562E−04 | −1.7245E−04 | −4.7607E−05 | 1.3949E−05 |
| S8 | 8.6827E−04 | 1.4338E−03 | −1.9153E−03 | 1.6777E−03 |
| S9 | −1.0722E−03 | 6.9066E−04 | −8.4076E−05 | −5.5438E−05 |
| S10 | −2.4371E−03 | 7.8741E−04 | −5.2526E−05 | 5.5315E−05 |

Figure 23A:
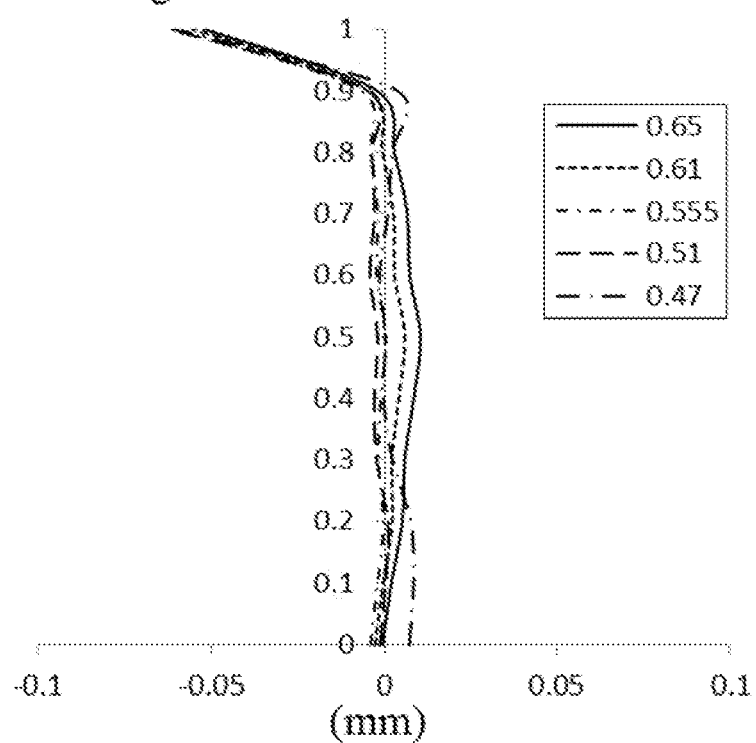
FIG. 23A to FIG. 23C illustrate a longitudinal aberration curve, astigmatism curve and distortion curve of an imaging lens assembly of which a movable diaphragm is at a minimum distance from an imaging surface of the imaging lens assembly on an optical axis according to embodiment 6 respectively.
Figure 23B:
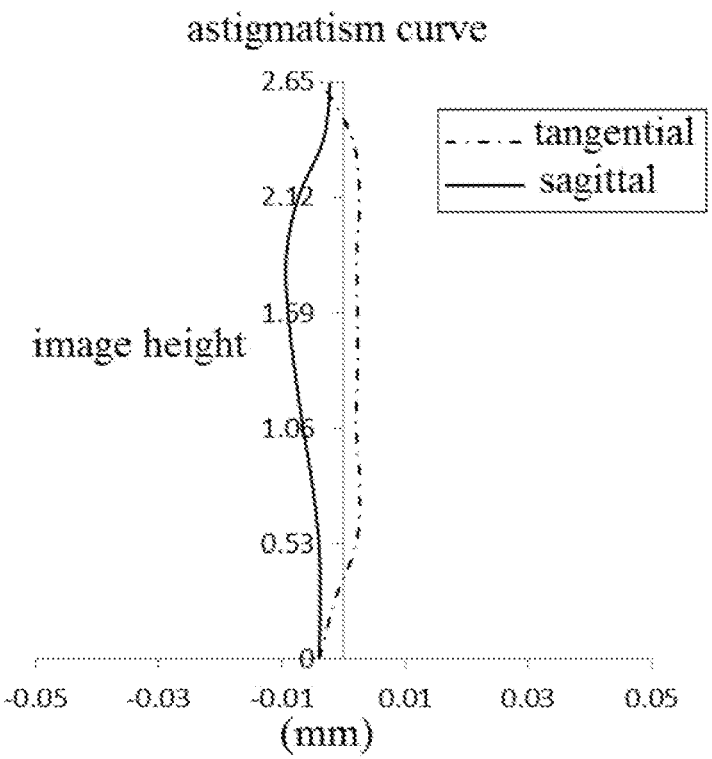
Figure 23C:
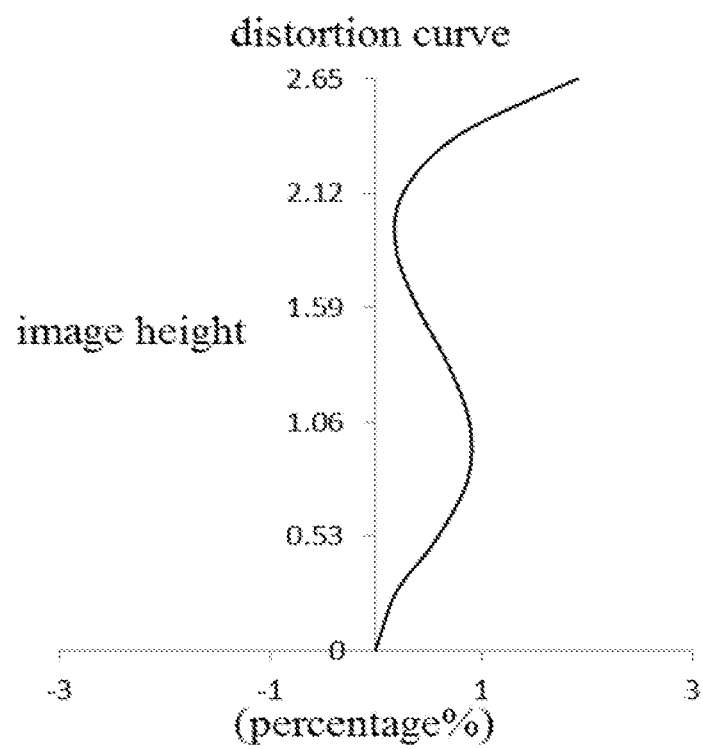
Figure 24B:
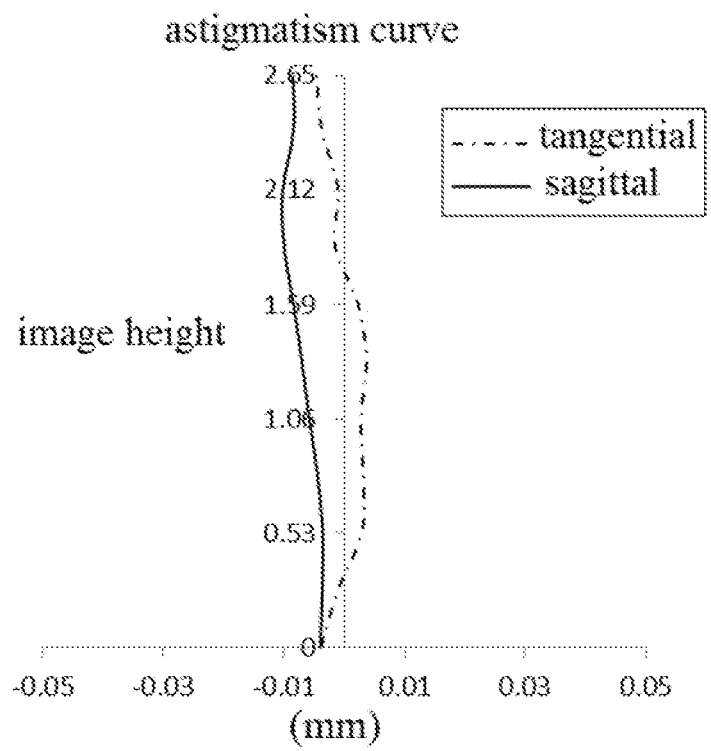
Figure 24C:
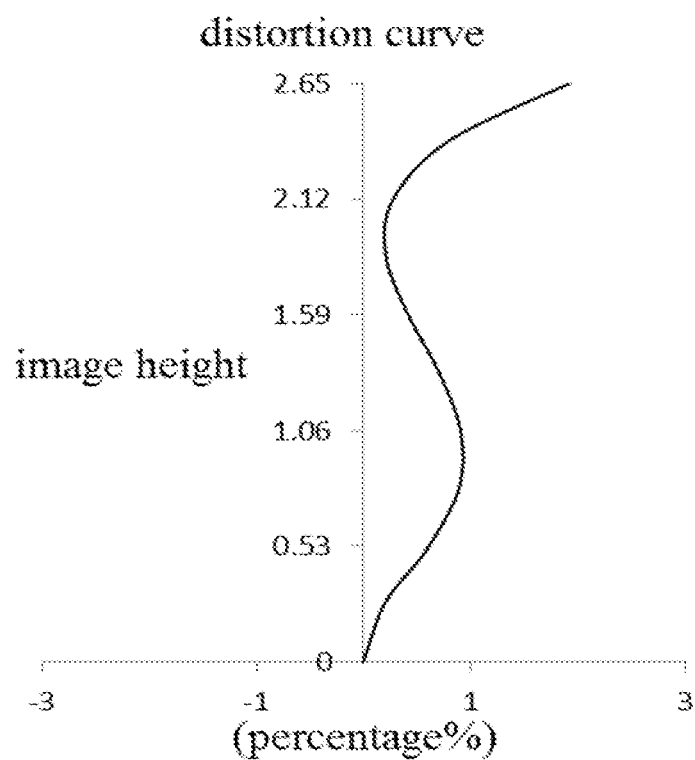

FIG. 23A and FIG. 24A show longitudinal aberration curves of the imaging lens assembly of which the movable diaphragm is at the minimum distance and the maximum distance from the imaging surface of the imaging lens assembly on the optical axis according to embodiment 6 respectively to represent deviation of a convergence focal point after light with different wavelengths passes through the lens. FIG. 23B and FIG. 24B show astigmatism curves of the imaging lens assembly of which the movable diaphragm is at the minimum distance and the maximum distance from the imaging surface of the imaging lens assembly on the optical axis according to embodiment 6 respectively to represent a tangential image surface curvature and a sagittal image surface curvature. FIG. 23C and FIG. 24C show distortion curves of the imaging lens assembly of which the movable diaphragm is at the minimum distance and the maximum distance from the imaging surface of the imaging lens assembly on the optical axis according to embodiment 6 respectively to represent distortion values corresponding to different image heights.

According to FIG. 23A to FIG. 24C, it can be seen that the imaging lens assembly provided in embodiment 6 achieves high imaging quality.

Embodiment 7

Figure 25:
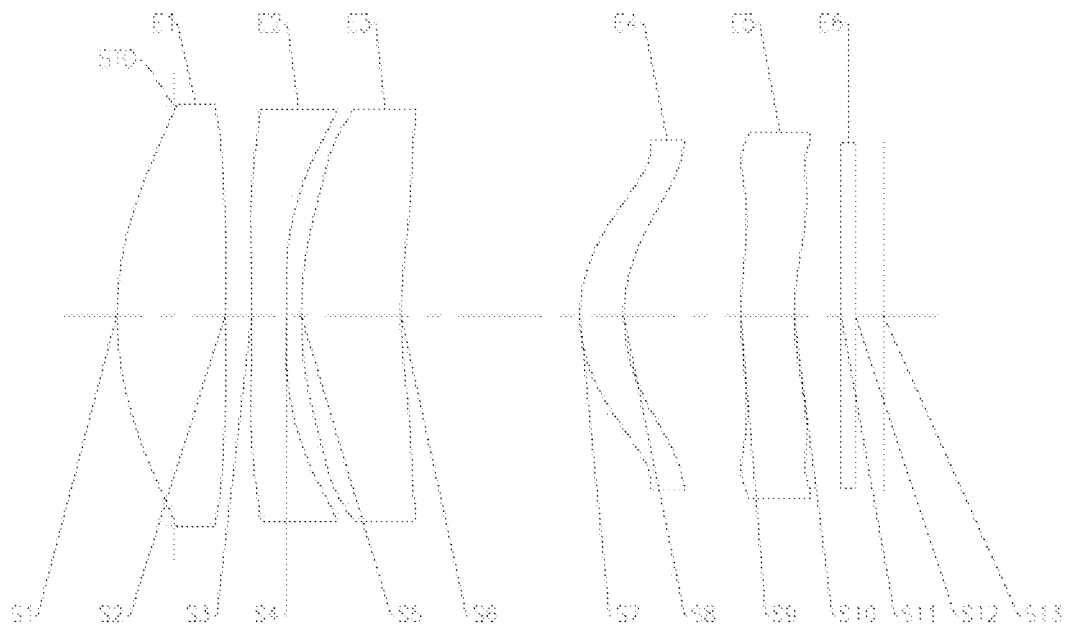
FIG. 25 illustrates a structure diagram of an imaging lens assembly according to embodiment 7 of the disclosure, a movable diaphragm being at a minimum distance from an imaging surface of the imaging lens assembly.
Figure 26:
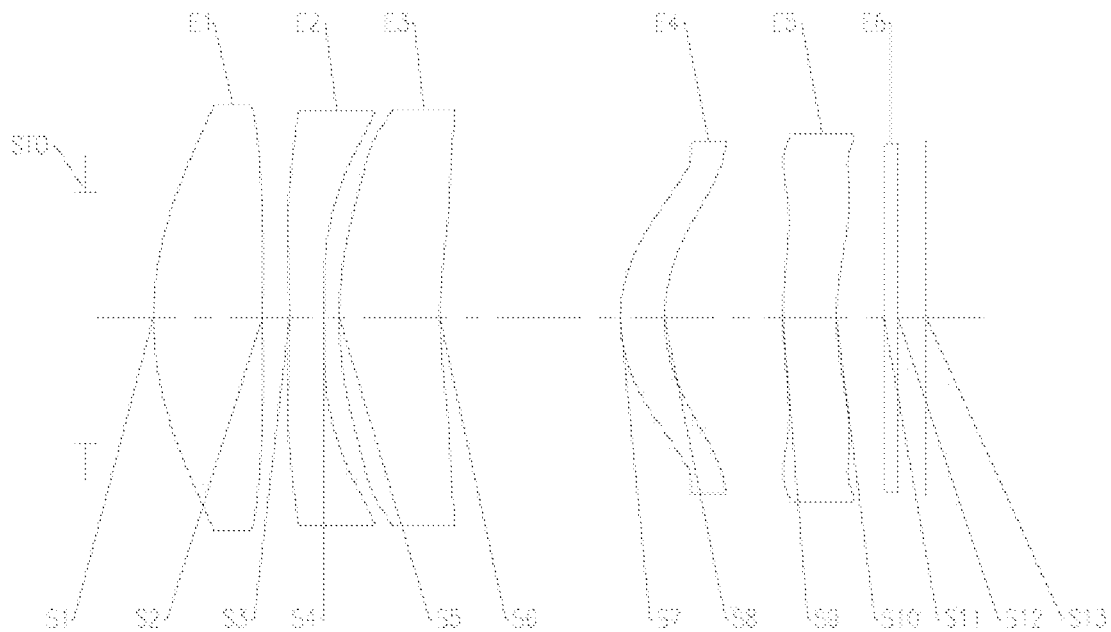
FIG. 26 illustrates a structure diagram of an imaging lens assembly according to embodiment 7 of the disclosure, a movable diaphragm being at a maximum distance from an imaging surface of the imaging lens assembly.

An imaging lens assembly according to embodiment 7 of the disclosure will be described below with reference to FIG. 25 to FIG. 28C. FIG. 25 and FIG. 26 are structure diagrams of an imaging lens assembly of which a movable diaphragm is at a minimum distance and a maximum distance from an imaging surface of the imaging lens assembly according to embodiment 7 of the disclosure respectively. As shown in FIG. 25 and FIG. 26, the imaging lens assembly sequentially includes, from an object side to an image side, a movable diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, while an image-side surface S2 is a convex surface. The second lens E2 has a positive refractive power, an object-side surface S3 thereof is a concave surface, while an image-side surface S4 is a convex surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The optical filter E6 has an object-side surface S11 and an image-side surface S12. Light from an object sequentially passes through each of the surfaces S1 to S12 and is finally imaged on the imaging surface S13.

In the example, a total effective focal length f of the imaging lens assembly is 9.11 mm, TSmin, a distance from the movable diaphragm at the minimum distance from the imaging surface of the imaging lens assembly to the object-side surface of the first lens on an optical axis, is −0.8502 mm, TSmax, a distance from the movable diaphragm at the maximum distance from the imaging surface of the imaging lens assembly to the object-side surface of the first lens on the optical axis, is 1.0000 mm, FNOmin, an f-number of the imaging lens assembly when the distance from the movable diaphragm to the imaging surface of the imaging lens assembly on the optical axis is minimum, is 1.44, FNOmax, an f-number of the imaging lens assembly when the distance from the movable diaphragm to the imaging surface of the imaging lens assembly on the optical axis is maximum, is 2.42, and a maximum FOV of the imaging lens assembly is 32.1°.

Table 13 is a basic parameter table of the imaging lens assembly of embodiment 7, and units of the radius of curvature, the thickness/distance and the focal length are all mm. Table 14 shows high-order coefficients applied to each aspherical mirror surface in embodiment 7. A surface type of each aspherical surface is defined by the formula (1) given in embodiment 1.

TABLE 13

| Surface number | Surface type | Radius of curvature | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | TS | | | | |
| S1 | Aspherical | 4.7735 | 1.6248 | 1.546 | 56.14 | 12.35 | 0.2078 |
| S2 | Aspherical | −31.9621 | 0.4018 | | | | 0.0000 |
| S3 | Aspherical | −24.3146 | 0.5176 | 1.645 | 23.53 | 10000.00 | 58.5156 |
| S4 | Aspherical | −24.4253 | 0.2239 | | | | 0.0000 |
| S5 | Aspherical | 8.1216 | 1.4962 | 1.546 | 56.14 | −68.45 | −0.8760 |
| S6 | Aspherical | 6.2375 | 2.6791 | | | | 2.6594 |
| S7 | Aspherical | 2.1589 | 0.6599 | 1.546 | 56.14 | 18.08 | −1.1018 |
| S8 | Aspherical | 2.4649 | 1.7608 | | | | −0.7529 |
| S9 | Aspherical | 5.2211 | 0.7980 | 1.667 | 20.37 | −23.84 | −50.0826 |
| S10 | Aspherical | 14.3345 | 0.7075 | | | | 0.0000 |
| S11 | Spherical | Infinite | 0.2100 | 1.518 | 64.17 | | |
| S12 | Spherical | Infinite | 0.4203 | | | | |
| S13 | Spherical | Infinite | | | | | |

TABLE 14

| Surface number | A4 | A6 | A8 | A10 | A12 |
|---|---|---|---|---|---|
| S1 | −3.2841E−01 | −1.8656E−02 | −7.6514E−03 | −1.0000E−04 | −3.6595E−04 |
| S2 | 2.0122E−01 | −1.8322E−02 | 3.1494E−02 | 1.9195E−02 | 6.0892E−03 |
| S3 | 4.8654E−01 | −2.4117E−02 | −3.6036E−03 | 1.1391E−02 | −4.1171E−03 |
| S4 | −6.2211E−02 | −1.4500E−01 | 6.6021E−02 | −6.0102E−02 | −8.6415E−03 |
| S5 | 1.1096E−01 | −5.6170E−02 | 4.3483E−02 | −1.2332E−02 | 2.6799E−03 |
| S6 | −7.3009E−01 | 5.0366E−02 | −1.9290E−03 | −3.0571E−04 | 1.7952E−04 |
| S7 | −2.6606E−01 | −1.1057E−01 | −1.4133E−02 | 2.0324E−03 | 4.0804E−04 |
| S8 | −4.8705E−01 | −9.7309E−02 | 1.3150E−02 | 6.5743E−03 | −2.2423E−03 |
| S9 | −3.2037E−01 | 5.1917E−02 | 4.2525E−02 | −8.0679E−03 | −7.4989E−04 |
| S10 | 4.4215E−02 | 1.8511E−01 | 1.7880E−01 | −2.1185E−01 | 1.4885E−01 |

| Surface number | A14 | A16 | A18 | A20 |
|---|---|---|---|---|
| S1 | −7.9083E−05 | 5.8037E−05 | 1.0050E−05 | −2.4251E−05 |
| S2 | 8.7146E−03 | 9.0733E−04 | 8.5049E−04 | −1.0405E−03 |
| S3 | 4.5281E−03 | −1.0376E−03 | 2.6199E−04 | 7.0932E−05 |
| S4 | −1.9877E−03 | 3.0082E−04 | 7.1183E−04 | −2.7398E−04 |
| S5 | −9.1756E−04 | 3.0503E−04 | −8.9256E−05 | 1.4005E−05 |
| S6 | −7.5058E−05 | 8.6339E−05 | 3.0289E−05 | 1.8189E−05 |
| S7 | −1.6708E−04 | 6.3377E−05 | 6.4224E−05 | 3.4749E−05 |
| S8 | −8.9575E−04 | 2.9475E−04 | 2.0657E−04 | 5.5438E−05 |
| S9 | −1.4414E−03 | 7.7629E−04 | 4.9061E−05 | −6.5086E−05 |
| S10 | −8.0230E−02 | 3.4702E−02 | −1.3458E−02 | 3.5178E−03 |

Figure 27B:
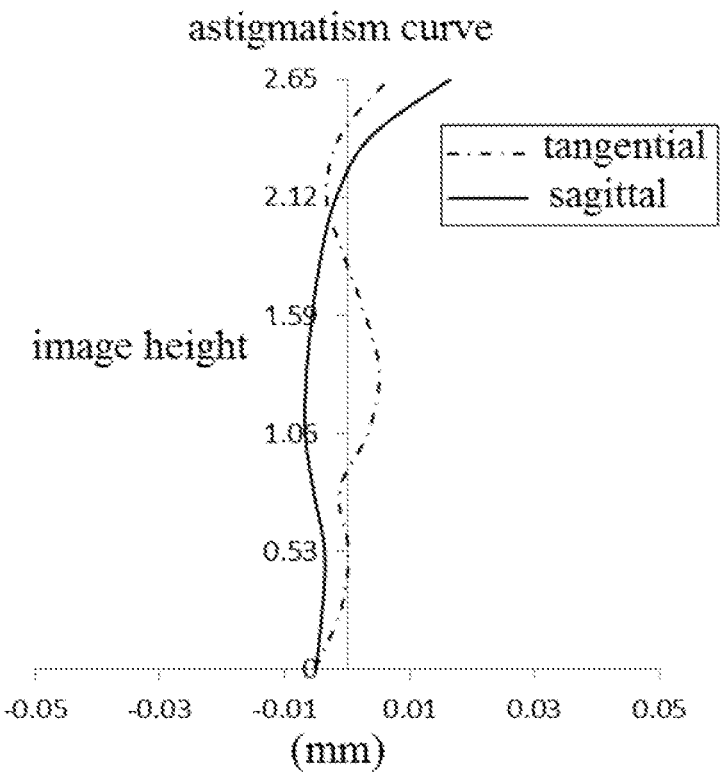
Figure 27C:
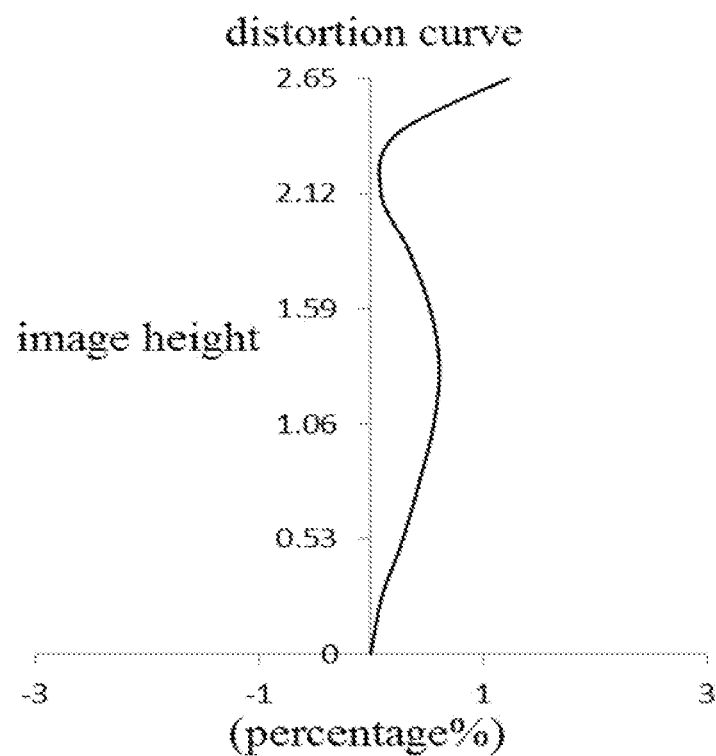
Figure 28B:
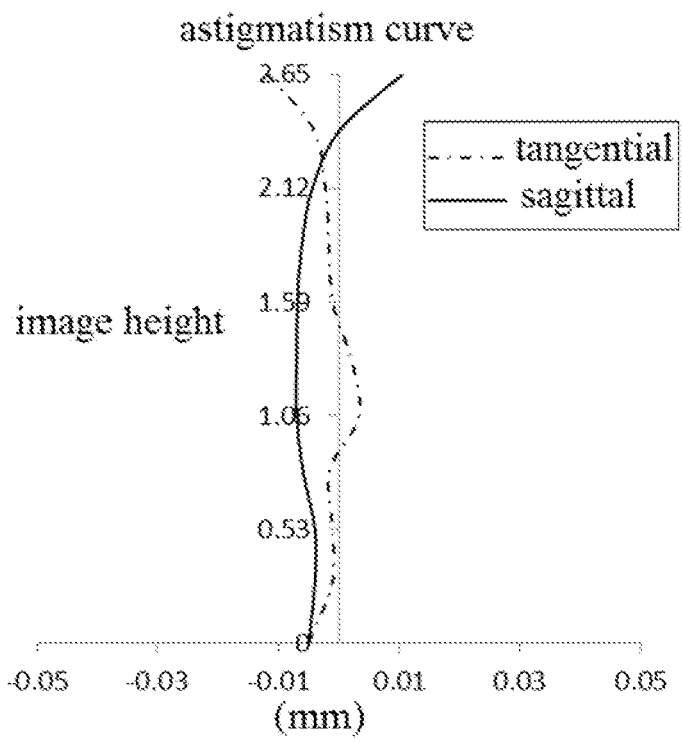
Figure 28C:
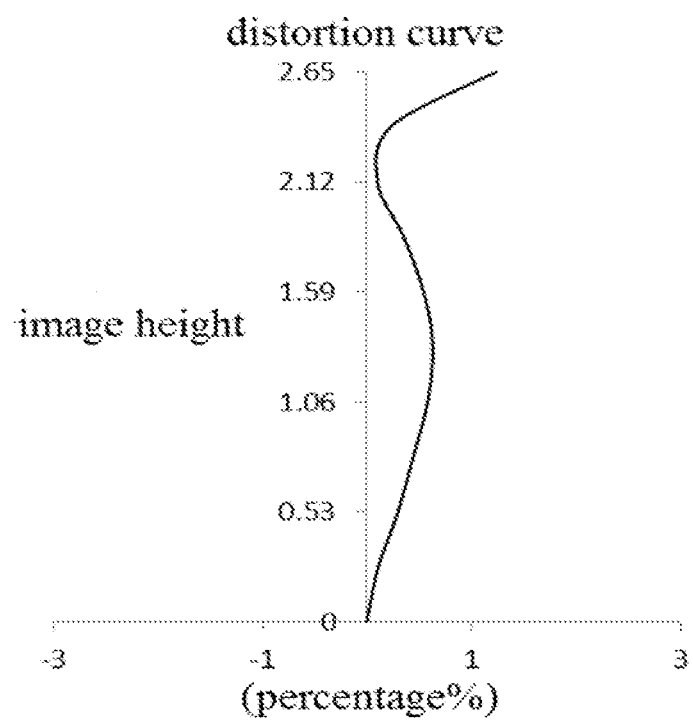

FIG. 27A and FIG. 28A show longitudinal aberration curves of the imaging lens assembly of which the movable diaphragm is at the minimum distance and the maximum distance from the imaging surface of the imaging lens assembly on the optical axis according to embodiment 7 respectively to represent deviation of a convergence focal point after light with different wavelengths passes through the lens. FIG. 27B and FIG. 28B show astigmatism curves of the imaging lens assembly of which the movable diaphragm is at the minimum distance and the maximum distance from the imaging surface of the imaging lens assembly on the optical axis according to embodiment 7 respectively to represent a tangential image surface curvature and a sagittal image surface curvature. FIG. 27C and FIG. 28C show distortion curves of the imaging lens assembly of which the movable diaphragm is at the minimum distance and the maximum distance from the imaging surface of the imaging lens assembly on the optical axis according to embodiment 7 respectively to represent distortion values corresponding to different image heights. According to FIG. 27A to FIG. 28C, it can be seen that the imaging lens assembly provided in embodiment 7 achieves high imaging quality.

From the above, embodiment 1 to embodiment 7 meet a relationship shown in Table 15 respectively.

TABLE 15

| Conditional expression | embodiment | | | | | | |
|---|---|---|---|---|---|---|---|
| | 1 | 2 | 3 | 4 | 5 | 6 | 7 |
| f4/f1 | 1.33 | 1.27 | 1.26 | 1.29 | 1.77 | 2.17 | 1.46 |
| (\|TSmin\| + \|TSmax\|)/CT1 | 1.13 | 1.10 | 1.11 | 1.31 | 1.27 | 1.33 | 1.14 |
| (SAG41 + SAG42)/DT42 | 0.89 | 0.87 | 0.86 | 0.87 | 0.83 | 0.78 | 0.75 |
| SAG42/SAG41 | 1.00 | 0.99 | 0.95 | 1.03 | 1.21 | 1.29 | 0.87 |
| SAG22/CT2 | 1.36 | 1.26 | 1.09 | 1.26 | 1.37 | 1.39 | 1.46 |
| (T45 − SAG41)/CT4 | 1.27 | 1.31 | 1.35 | 1.23 | 1.20 | 1.39 | 1.06 |
| f4/(R7 + R8) | 2.61 | 2.44 | 2.45 | 2.73 | 2.86 | 3.45 | 3.91 |
| f/R5 + f/R6 | 2.66 | 2.66 | 2.16 | 3.08 | 2.30 | 2.72 | 2.58 |
| CT3/CT1 | 0.69 | 0.64 | 0.57 | 0.74 | 0.81 | 0.81 | 0.92 |
| DT11/DT52 | 1.22 | 1.22 | 1.19 | 1.23 | 1.22 | 1.23 | 1.20 |
| DT42/DT52 | 1.02 | 1.02 | 0.99 | 1.02 | 1.03 | 1.03 | 0.99 |
| EPDmax/ImgH | 2.39 | 2.39 | 2.39 | 2.39 | 2.39 | 2.39 | 2.39 |

Some embodiments of the disclosure also provide an imaging device, of which an electronic photosensitive element may be a Charge Coupled Device (CCD) or a Complementary Metal Oxide Semiconductor (CMOS). The imaging device may be an independent imaging device such as a digital camera and may also be an imaging module integrated into a mobile electronic device such as a mobile phone. The imaging device is provided with the abovementioned imaging lens assembly.

The above description is only description about some embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An imaging lens assembly, sequentially comprising, from an object side to an image side along an optical axis:
 a movable diaphragm,
 a first lens with a positive refractive power,
 a second lens with a refractive power,
 a third lens with a refractive power,
 a fourth lens with a positive refractive power and
 a fifth lens with a refractive power,
 wherein an effective focal length f1 of the first lens and an effective focal length f4 of the fourth lens meet 1.0<f4/f1<2.3; and
 TSmin, a distance from the movable diaphragm at a minimum distance from an imaging surface of the imaging lens assembly to an object-side surface of the first lens on the optical axis, TSmax, a distance from the movable diaphragm at a maximum distance from the imaging surface of the imaging lens assembly to the object-side surface of the first lens on the optical axis and CT1, a center thickness of the first lens on the optical axis meet 1.0<(|TSmin|+|TSmax|)/CT1<1.5.

2. The imaging lens assembly according to claim 1, wherein SAG41, a distance from an intersection point of an object-side surface of the fourth lens and the optical axis to a maximum effective radius vertex of the object-side surface of the fourth lens on the optical axis, SAG42, a distance from an intersection point of an image-side surface of the fourth lens and the optical axis to a maximum effective radius vertex of the image-side surface of the fourth lens on the optical axis and DT42, a maximum effective radius of the image-side surface of the fourth lens meet 0.7<(SAG41+SAG42)/DT42<1.0.

3. The imaging lens assembly according to claim 1, wherein SAG41, a distance from an intersection point of an object-side surface of the fourth lens and the optical axis to a maximum effective radius vertex of the object-side surface of the fourth lens on the optical axis and SAG42, a distance from an intersection point of an image-side surface of the fourth lens and the optical axis to a maximum effective radius vertex of the image-side surface of the fourth lens on the optical axis meet 0.8<SAG42/SAG41≤1.3.

4. The imaging lens according assembly to claim 1, wherein SAG22, a distance from an intersection point of an image-side surface of the second lens and the optical axis to a maximum effective radius vertex of the image-side surface of the second lens on the optical axis and CT2, a center thickness of the second lens on the optical axis meet 1.0<SAG22/CT2<1.5.

5. The imaging lens assembly according to claim 1, wherein SAG41, a distance from an intersection point of an object-side surface of the fourth lens and the optical axis to a maximum effective radius vertex of the object-side surface of the fourth lens on the optical axis, T45, a spacing distance of the fourth lens and the fifth lens on the optical axis and CT4, a center thickness of the fourth lens on the optical axis meet 1.0<(T45−SAG41)/CT4<1.5.

6. The imaging lens assembly according to claim 1, wherein the effective focal length f4 of the fourth lens, a radius of curvature R7 of an object-side surface of the fourth lens and a radius of curvature R8 of an image-side surface of the fourth lens meet 1.0<f4/(R7+R8)<4.0.

7. The imaging lens assembly according to claim 1, wherein a total effective focal length f of the imaging lens assembly, a radius of curvature R5 of an object-side surface of the third lens and a radius of curvature R6 of an image-side surface of the third lens meet 2.0<f/R5+f/R6<3.5.

8. The imaging lens assembly according to claim 7, wherein CT3, a center thickness of the third lens on the optical axis and CT1, the center thickness of the first lens on the optical axis meet 0.5<CT3/CT1<1.0.

9. The imaging lens assembly according to claim 1, wherein DT11, a maximum effective radius of the object-side surface of the first lens and DT52, a maximum effective radius of an image-side surface of the fifth lens meet 1.0<DT11/DT52<1.3.

10. The imaging lens assembly according to claim 1, wherein DT42, a maximum effective radius of an image-side surface of the fourth lens and DT52, a maximum effective radius of an image-side surface of the fifth lens meet 0.9<DT42/DT52<1.1.

11. The imaging lens assembly according to claim 1, wherein EPDmax, a maximum entrance pupil diameter (EPD) of the imaging lens assembly and ImgH, a half of a diagonal length of an effective pixel region on the imaging surface of the imaging lens assembly meet EPDmax/ImgH<2.5.

12. An imaging lens assembly, sequentially comprising, from an object side to an image side along an optical axis:
a movable diaphragm,
a first lens with a positive refractive power,
a second lens with a refractive power,
a third lens with a refractive power,
a fourth lens with a positive refractive power and
a fifth lens with a refractive power,
wherein TSmin, a distance from the movable diaphragm at a minimum distance from an imaging surface of the imaging lens assembly to an object-side surface of the first lens on the optical axis, TSmax, a distance from the movable diaphragm at a maximum distance from the imaging surface of the imaging lens assembly to the object-side surface of the first lens on the optical axis and CT1, a center thickness of the first lens on the optical axis meet 1.0<(|TSmin|+|TSmax|)/CT1<1.5; and
SAG41, a distance from an intersection point of an object-side surface of the fourth lens and the optical axis to a maximum effective radius vertex of the object-side surface of the fourth lens on the optical axis, SAG42, a distance from an intersection point of an image-side surface of the fourth lens and the optical axis to a maximum effective radius vertex of the image-side surface of the fourth lens on the optical axis and DT42, a maximum effective radius of the image-side surface of the fourth lens meet 0.7<(SAG41+SAG42)/DT42<1.0.

13. The imaging lens assembly according to claim 12, wherein DT42, a maximum effective radius of an image-side surface of the fourth lens and DT52, a maximum effective radius of an image-side surface of the fifth lens meet 0.9<DT42/DT52<1.1.

14. The imaging lens assembly according to claim 12, wherein SAG41, a distance from an intersection point of an object-side surface of the fourth lens and the optical axis to a maximum effective radius vertex of the object-side surface of the fourth lens on the optical axis and SAG42, a distance from an intersection point of an image-side surface of the fourth lens and the optical axis to a maximum effective radius vertex of the image-side surface of the fourth lens on the optical axis meet 0.8<SAG42/SAG41≤1.3.

15. The imaging lens assembly according to claim 12, wherein SAG22, a distance from an intersection point of an image-side surface of the second lens and the optical axis to a maximum effective radius vertex of the image-side surface of the second lens on the optical axis and CT2, a center thickness of the second lens on the optical axis meet 1.0<SAG22/CT2<1.5.

16. The imaging lens assembly according to claim 12, wherein SAG41, a distance from an intersection point of an object-side surface of the fourth lens and the optical axis to a maximum effective radius vertex of the object-side surface of the fourth lens on the optical axis, T45, a spacing distance of the fourth lens and the fifth lens on the optical axis and CT4, a center thickness of the fourth lens on the optical axis meet 1.0<(T45−SAG41)/CT4<1.5.

17. The imaging lens assembly according to claim 12, wherein the effective focal length f4 of the fourth lens, a radius of curvature R7 of an object-side surface of the fourth lens and a radius of curvature R8 of an image-side surface of the fourth lens meet 1.0<f4/(R7+R8)<4.0.

18. The imaging lens assembly according to claim 12, wherein a total effective focal length f of the imaging lens assembly, a radius of curvature R5 of an object-side surface of the third lens and a radius of curvature R6 of an image-side surface of the third lens meet 2.0<f/R5+f/R6<3.5.

19. The imaging lens assembly according to claim 12, wherein CT3, a center thickness of the third lens on the optical axis and CT1, the center thickness of the first lens on the optical axis meet 0.5<CT3/CT1<1.0.

20. The imaging lens assembly according to claim 12, wherein DT11, a maximum effective radius of the object-side surface of the first lens and DT52, a maximum effective radius of an image-side surface of the fifth lens meet 1.0<DT11/DT52<1.3.

* * * * *